US010570331B2

(12) United States Patent
Southwell et al.

(10) Patent No.: US 10,570,331 B2
(45) Date of Patent: *Feb. 25, 2020

(54) CRUDE OIL RECOVERY CHEMICAL FLUID

(71) Applicant: NISSAN CHEMICAL AMERICA CORPORATION, Houston, TX (US)

(72) Inventors: John Edmond Southwell, Glen Ellyn, IL (US); Satoru Murakami, Chiba (JP); Isao Oota, Chiba (JP)

(73) Assignee: Nissan Chemical America Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,705

(22) Filed: Sep. 12, 2018

(65) Prior Publication Data
US 2019/0078016 A1 Mar. 14, 2019

(30) Foreign Application Priority Data
Sep. 13, 2017 (JP) .................................. 2017-175511

(51) Int. Cl.
C09K 8/584 (2006.01)
E21B 43/16 (2006.01)
C09K 8/588 (2006.01)

(52) U.S. Cl.
CPC .............. C09K 8/584 (2013.01); C09K 8/588 (2013.01); E21B 43/16 (2013.01); C09K 2208/10 (2013.01)

(58) Field of Classification Search
CPC ...... C09K 3/00; C09K 11/08; C09K 19/2014; C09K 3/1409; C09K 11/02; C09K 11/025; C09K 11/883; C09K 19/02; C09K 19/04; C09K 19/0403; C09K 19/2007; C09K 19/22; C09K 19/322; C09K 19/3444; C09K 19/3472; C09K 19/348; C09K 19/3486; C09K 19/3497; C09K 19/36; C09K 19/54; C09K 19/56; C09K 19/586; C09K 19/588; C09K 19/60; C09K 2019/0425; C09K 2019/0448; C09K 2019/188; C09K 2019/2092; C09K 2019/3408; C09K 2208/10; C09K 3/1021; C09K 3/18; C09K 5/063; C09K 8/03; C09K 8/426; C09K 8/56; C09K 8/588; C09K 8/604; C09K 8/62; C09K 8/665; C09K 8/68; C09K 8/72; C09K 8/805; C09K 8/845; C09K 8/86; C09K 8/905; C09K 8/584
See application file for complete search history.

(56) References Cited

U.S. PATENT DOCUMENTS

| 3,506,070 | A | 4/1970 | Jones |
| 3,613,786 | A | 10/1971 | Jones et al. |
| 3,623,553 | A | 11/1971 | Burdge |
| 3,740,343 | A | 6/1973 | Jones |
| 3,885,628 | A | 5/1975 | Reed et al. |
| 3,981,361 | A | 9/1976 | Healy |
| 4,240,504 | A | 12/1980 | Reed |
| 4,328,106 | A | 5/1982 | Harrar et al. |
| 4,348,462 | A | 9/1982 | Chung |
| 4,390,068 | A | 6/1983 | Patton et al. |
| 4,892,146 | A | 1/1990 | Shen |
| 5,168,082 | A * | 12/1992 | Matchett ............... C04B 35/117 106/287.1 |
| 5,381,863 | A | 1/1995 | Wehner |
| 6,863,985 | B2 | 3/2005 | Stark et al. |
| 7,033,975 | B2 | 4/2006 | Baran et al. |
| 7,101,616 | B2 | 9/2006 | Arney et al. |
| 7,216,712 | B2 | 5/2007 | Dalton |
| 7,380,606 | B2 | 6/2008 | Pursley et al. |
| 7,482,310 | B1 | 1/2009 | Reese et al. |
| 7,544,726 | B2 | 6/2009 | Greenwood |
| 7,553,888 | B2 | 6/2009 | Greenwood et al. |
| 8,101,812 | B2 | 1/2012 | Fan et al. |
| 8,272,442 | B2 | 9/2012 | Fan et al. |
| 8,404,107 | B2 | 3/2013 | Fan et al. |
| 9,068,108 | B2 | 6/2015 | Hill et al. |
| 9,181,468 | B2 | 11/2015 | Fan et al. |
| 9,321,955 | B2 | 4/2016 | Hill et al. |
| 9,428,683 | B2 | 8/2016 | Hill et al. |
| 9,464,223 | B2 | 10/2016 | Champagne et al. |
| 9,505,970 | B2 | 11/2016 | Vaughn et al. |
| 9,512,352 | B2 | 12/2016 | Roddy et al. |
| 9,522,876 | B2 | 12/2016 | Winters et al. |
| 9,685,234 | B2 | 6/2017 | Balluchi et al. |
| 9,708,525 | B2 | 7/2017 | Suresh et al. |

(Continued)

FOREIGN PATENT DOCUMENTS

| CN | 101735787 | * | 6/2010 |
| CN | 101735787 | A | 6/2010 |

(Continued)

OTHER PUBLICATIONS

Technical data sheet of Aerosil R972 downloaded on Jun. 12, 2019.*
Sears, "Determination of Specific Surface Area of Colloidal Silica by Titration with Sodium Hydroxide", Analytical Chemistry, 28:12, pp. 1981-1983 (Dec. 1956)
Farooqui et al., "Improvement of the Recovery Factor Using Nano-Metal Particles at the Late Stages of Cyclic Steam Stimulation", Society of Petroleum Engineers, XP-002776733, SPE-174478-MS, Jun. 11, 2015.
Ju et al., "Enhanced Oil Recovery by Flooding with Hydrophilic NanoParticles", China Particuology vol. 4, No. 1, 41-46, 2006.

(Continued)

Primary Examiner — Kumar R Bhushan
(74) Attorney, Agent, or Firm — Nixon & Vanderhye P.C.

(57) ABSTRACT

A crude oil recovery chemical fluid is described and claimed. This fluid has been shown to exhibit excellent resistance to salt and high temperatures. This crude oil recovery chemical fluid includes a silane compound, an aqueous silica sol having an average particle diameter of from about 3 nm to about 200 nm, two or more anionic surfactants, and one or more nonionic surfactants.

8 Claims, No Drawings

(56) References Cited

U.S. PATENT DOCUMENTS

| | | | |
|---|---|---|---|
| 9,725,999 | B2 | 8/2017 | Castrogiovanni et al. |
| 9,790,414 | B2 | 10/2017 | Champagne et al. |
| 9,850,418 | B2 | 12/2017 | Champagne et al. |
| 9,868,893 | B2 | 1/2018 | Saboowala et al. |
| 9,884,988 | B2 | 2/2018 | Dismuke et al. |
| 10,113,406 | B1 | 10/2018 | Gomaa et al. |
| 10,160,682 | B2 | 12/2018 | Mehta et al. |
| 10,377,942 | B2 | 8/2019 | Southwell et al. |
| 2003/0220204 | A1 | 11/2003 | Baran et al. |
| 2004/0077768 | A1 | 4/2004 | Greenwood |
| 2004/0097600 | A1 | 5/2004 | Greenwood et al. |
| 2006/0260815 | A1* | 11/2006 | Dahanayake .......... C09K 8/602 166/308.6 |
| 2007/0238088 | A1 | 10/2007 | Rubinsztajn et al. |
| 2008/0289828 | A1* | 11/2008 | Hutchins .................. C09K 8/68 166/308.3 |
| 2010/0096139 | A1 | 4/2010 | Holcomb et al. |
| 2010/0147515 | A1 | 6/2010 | Hughes et al. |
| 2011/0220360 | A1 | 9/2011 | Lindvig et al. |
| 2012/0024530 | A1 | 2/2012 | Todd et al. |
| 2012/0168165 | A1 | 7/2012 | Holcomb et al. |
| 2012/0175120 | A1 | 7/2012 | Holcomb et al. |
| 2013/0341020 | A1 | 12/2013 | Nguyen et al. |
| 2014/0116695 | A1 | 5/2014 | Maghrabi et al. |
| 2014/0162911 | A1* | 6/2014 | Monastiriotis ......... C09K 8/805 507/221 |
| 2014/0284053 | A1 | 9/2014 | Germack |
| 2014/0332218 | A1 | 11/2014 | Castrogiovanni et al. |
| 2014/0338906 | A1 | 11/2014 | Monastiriotis et al. |
| 2014/0338911 | A1 | 12/2014 | Hill et al. |
| 2014/0374095 | A1 | 12/2014 | Ladva et al. |
| 2015/0068744 | A1* | 3/2015 | Welton ..................... C09K 8/08 166/279 |
| 2015/0068755 | A1 | 3/2015 | Hill et al. |
| 2015/0218435 | A1 | 8/2015 | Suresh et al. |
| 2015/0268370 | A1 | 9/2015 | Johnston et al. |
| 2015/0292308 | A1 | 10/2015 | Conway |
| 2016/0017204 | A1 | 1/2016 | Hill et al. |
| 2016/0137907 | A1 | 5/2016 | Vo et al. |
| 2016/0194550 | A1 | 7/2016 | Hill et al. |
| 2016/0362594 | A1* | 12/2016 | Rojas ..................... C09K 8/467 |
| 2016/0369158 | A1 | 12/2016 | Patino |
| 2017/0306219 | A1 | 10/2017 | Quintero et al. |
| 2018/0291255 | A1 | 10/2018 | Southwell |
| 2018/0291261 | A1 | 10/2018 | Southwell et al. |
| 2019/0078015 | A1 | 3/2019 | Southwell et al. |
| 2019/0093462 | A1 | 3/2019 | Watts et al. |
| 2019/0136123 | A1 | 5/2019 | Holcomb et al. |
| 2019/0225871 | A1 | 7/2019 | Southwell |

FOREIGN PATENT DOCUMENTS

| | | | |
|---|---|---|---|
| CN | 102838981 | * | 12/2012 |
| CN | 102838981 | A | 12/2012 |
| CN | 106085401 | * | 11/2016 |
| CN | 106085401 | A | 11/2016 |
| EP | 2465911 | | 6/2002 |
| EP | 1509676 | | 3/2005 |
| EP | 1818693 | | 8/2007 |
| JP | H01-035157 | | 7/1989 |
| JP | H01234468 | A | 9/1989 |
| JP | H03 31380 | | 2/1991 |
| JP | H05-086989 | | 12/1993 |
| JP | H10111544 | A | 4/1998 |
| JP | 2004-150859 | | 5/2004 |
| JP | 4033970 | | 1/2008 |
| JP | 5026264 | | 9/2012 |
| KR | 101872020 | B1 | 6/2018 |
| WO | WO 1995/011280 | | 4/1995 |
| WO | WO 2003/100214 | | 12/2003 |
| WO | WO-2005018300 | A2 | 3/2005 |
| WO | 2009044912 | A1 | 4/2009 |
| WO | WO 2010/103020 | | 9/2010 |
| WO | 2013192634 | A2 | 12/2013 |
| WO | WO 2014/153102 | A1 | 9/2014 |
| WO | 2014176188 | A1 | 10/2014 |
| WO | WO 2014/201367 | A1 | 12/2014 |
| WO | WO 2016/040742 | | 3/2016 |
| WO | WO 2016/205289 | | 12/2016 |
| WO | 2017011328 | A1 | 1/2017 |
| WO | WO 2017/023665 | | 2/2017 |
| WO | 2017062086 | A1 | 4/2017 |
| WO | 2018157099 | A1 | 8/2018 |
| WO | 2018187550 | A1 | 10/2018 |
| WO | 2018187563 | A1 | 10/2018 |
| WO | 2019054414 | A1 | 3/2019 |

OTHER PUBLICATIONS

Goodwin et al., "Functionalization of Colloidal Silica and Silica Surfaces via Silylation Reactions", Colloid Polym Sci 268:766-777 (1990).

Zhang, et al., "Foams and Emulsions Stabilized with Nanoparticles for Potential Conformance Control Applications", SPE International Symposium on Oilfield Chemistry held in the Woodlands, Texas, USA, Apr. 20-22, 2009.

McElfresh et al., "Application of Nanofluid Technology to Improve Recovery in Oil and Gas Wells", SPE International Oilfield Nanotechnology Conference held in Noordwijk, The Netherlands, Jun. 12-14, 2012.

Hoelscher et al., "Application of NanoTechnology in Drilling Fluids", SPE International Oilfield Nanotechnology Conference held in Noordwijk, The Netherlands, Jun. 12-14, 2012.

Hendraningrat et al., "A Corefield Investigation of Nanofluid Enhanced Oil Recovery in Low-Medium Permeability Berea Sandstone", SPE International Symposium on Oilfield Chemistry held in the Woodlands, Texas, USA, Apr. 8-10, 2013.

Arkles, "Hydrophobicity, Hydrophilicity and Silanes", Paint & Coatings Industry Magazine, Oct. 2006.

European Search Report dated Jul. 31, 2017 in European Patent Application No. 17166435.2 (8 pages).

European Search Report dated Jul. 31, 2017 in European Patent Application No. 17166443.6 (7 pages).

European Search Report dated Jul. 31, 2017 in European Patent Application No. 17166426.1 (7 pages).

International Search Report dated Aug. 1, 2018, in International Patent Application No. PCT/US2018/026227 (15 pages).

Estephan et al., "Zwitterion-Stabilized Silica Nanoparticles: Toward Nonstick Nano", Langmuir, vol. 26, No. 22, Nov. 16, 2010; 16884-16889 (6 pages).

Bjorkegren, et al., "Hydrophilic and hydrophobic modifications of colloidal silica particles for Pickering emulsions", Journal of Colloid and Interface Science, Academic Press, Inc, US, vol. 487, Oct. 15, 2016; 250-257.

Bjorkegren, "Functionalization and characterization of aqueous silica sols and their application in Pickering emulsions", Jan. 1, 2016, XP055492689, Retrieved from the Internet, www://publications.lib.chalmers.se/records/fulltext/246587/246587.pdf. pp. 1-34 and 7 page index (41 pages).

Bjorkegren, et al., "Surface activity and flocculation behavior of polyethylene glycol-functionalized silica nanoparticles", Journal of Colloid and Interface Science, Academic Press,Inc, US, vol. 452, Apr. 27, 2015, 215-223 (9 pages).

De Lara et al., "Functionalized Silica Nanoparticles within Multicomponent Oil/Brine Interfaces: A Study in Molecular Dynamics", Journal of Physical Chemistry C, vol. 120, No. 12, Mar. 22, 2016, 6787-6795 (9 pages).

International Search Report dated Aug. 1, 2018, in International Patent Application No. PCT/US2018/026245 (14 pages).

Brunel, "Functionalized micelle-templated silicas (MTS) and their use as catalysts for fine chemicals", Microporous and Mesoporous Materials, vol. 27, No. 2-3, Feb. 1, 1999, 329-344 (16 pages).

Non-Final Office Action dated Sep. 10, 2018, in U.S. Appl. No. 15/946,252 (10 pages).

Non-Final Office Action dated Jun. 5, 2018, in U.S. Appl. No. 15/945,338 (16 pages).

(56) References Cited

OTHER PUBLICATIONS

A Search Report dated Oct. 12, 2018 in Great Britain Application No. GB1811749.9 (3 pages).
Alomair, O,A., et al., "Nanofluids Application for Heavy Oil Recovery" SPE International, SPE-171539-MS, Society of Petroleum Engineers (Oct. 2014).
Amendment and Response to Office Action with Declaration Under 37 C.F.R. §1.132 filed Jan. 11, 2019 in U.S. Appl. No. 15/946,338.
Aminzadeh, B., et al., "Influence of Surface-Treated Nanoparticles on Displacement Patterns During CO Injection," SPE Annual Technical Conference and Exhibition, 20 pages (Jan. 2013).
Carpenter, "Modeling of Production Decline Caused by Fines Migration in Deepwater Reservoirs" Journal of Petroleum Technology, 75-77 (Feb. 2018).
Denney, "Nanosized Particles for Enhanced Oil Recovery" Journal of Petroleum Technology, 54-46 (Jan. 2011).
EPA, "Method 180.1: Determination of Turbidity by Nephelometry," (Aug. 1993).
Extended European Search Report dated Jan. 8, 2018, in EP Application No. 17194608.0 (6 pages).
International Search Report and Written Opinion for International Application No. PCT/JP2017/037208, European Patent Office, The Hague, dated Jun. 5, 2018, 8 pages.
International Search Report and Written Opinion for International Application No. PCT/US2018/052736, European Patent Office, The Hague, dated Dec. 12, 2018, 9 pages.
International Search Report and Written Opinion for International Application No. PCT/US2018/058954, European Patent Office, The Hague, dated Feb. 13, 2019, 12 pages.
Jurinak, J.J., et al., "Oilfield Applications of Colloidal Silica Gel," SPE Production Engineering, 6 (4):406-412 (Nov. 1991), XP055551121.
Li, L. et al., "Gas Selection for Huff-n-Puff EOR in Shale Oil Reservoirs Based upon Experimental and Numerical Study," Society of Petroleum Engineers, SPE-185066-MS, 15 pages (2017).
Li, L. et al., "Optimization of Huff-n-Puff Gas Injection to Enhance Oil Recovery in Shale Reservoirs," Society of Petroleum Engineers, SPE-180219-MS, 18 pages (2016).
Miller, B.J., et al., "Field Case: Cyclic Gas Recovery for Light Oil-Using Carbon Dioxide/Nitrogen/Natural Gas," Society of Petroleum Engineers, SPE 49169, 7 pages (1998).
Wilson, A., "Field Trials of Reservoir Nanoparticles Reveal Stability, High Rates of Recovery," Journal of Petroleum Technology, 64 (11):92-99 (Nov. 2012).
Palmer, F.S., et al., "Design and Implementation of Immiscible Carbon Dioxide Displacement Projects (CO2 Huff-Puff) in South Louisiana," Society of Petroleum Engineers, SPE 15497, 10 pages (1986).
Shafiq, M.U., et al., "Sandstone Matrix Acidizing Knowledge and Future Development," Journal of Petroleum Exploration and Production Technology, 7 (4):1205-1216 (Dec. 2017).
Skauge,T., et al.,"Nano-sized Particles for EOR" SPE International, SPE 129933, Society of Petroleum Engineers (Apr. 2010).
Syfan, F.E., et al., "Enhancing Delaware Basin Stimulation Results Using Nanoparticle Dispersion Technology," Society of Petroleum Engineers, SPE-189876-MS, 24 pages (2018).
Wang et al., "Waterless fracturing technologies for unconventional reservoirs—opportunities for liquid nitrogen" Journal of Natural Gas Science and Engineering, 35:160-174 (2016).
Wasan, D., et al., "Spreading of Nanofluids on Solids," Nature, 423:156-159 (May 2003).
Wei et al., "Mechanisms of N2 and CO2 Assisted Steam Huff-n-Puff Process in Enhancing Heavy Oil Recovery: A Case Study Using Experimental and Numerical Simulation," Society of Petroleum Engineers, SPE-183871-MS, 12 pages (2017).
Partial English translation of title page and claims of Chinese Publication No. 101735787 A, published Jun. 16, 2010.
Partial English translation of title page and claims of Chinese Publication No. 102838981 A, published Dec. 26, 2012.
Partial English translation of title page and claims of Chinese Publication No. 106085401 A, published Nov. 6, 2016.
English translation of the Written Opinion for corresponding International Application No. PCT/JP2018/033831, Japan Patent Office, dated Nov. 13, 2018, 6 pages.
Written Opinion for corresponding International Application No. PCT/JP2018/033831, Japan Patent Office, dated Nov. 13, 2018, 5 pages.
English machine translation of Korean Patent Publication No. 101872020 B1, published Jun. 27, 2018.
Final Office Action dated Jan. 4, 2019, in U.S. Appl. No. 15/946,252.
Non-Final Office Action dated Jan. 31, 2019, in U.S. Appl. No. 15/946,338.
Non-Final Office Action dated Jan. 31, 2019, in U.S. Appl. No. 16/179,676.
Non-Final Office Action dated Feb. 27, 2019, in U.S. Appl. No. 16/129,688.
Final Office Action dated Mar. 20, 2019, in U.S. Appl. No. 16/141,824.
Final Office Actiondated Jun. 18, 2019 in U.S. Appl. No. 16/129,688, filed Sep. 12, 2018.
Notice of Allowance dated Jun. 24, 2019 in U.S. Appl. No. 15/946,338, filed Apr. 5, 2018.
Final Office Action dated Aug. 19, 2019, in U.S. Appl. No. 16/179,676.
Non-Final Office Action dated Jul. 12, 2019, in U.S. Appl. No. 15/946,252.
Non-Final Office Action dated Aug. 1, 2019, in U.S. Appl. No. 16/374,060.
Non-Final Office Action dated Nov. 5, 2019, in U.S. Appl. No. 16/141,824.
U.S. Appl. No. 16/453,087, filed Jun. 26, 2019, Southwell, J. E. et al.

* cited by examiner

CRUDE OIL RECOVERY CHEMICAL FLUID

CROSS-REFERENCE TO RELATED PATENT APPLICATIONS

This patent application claims priority to Japanese Patent Application JP2017-175511 filed on Sep. 13, 2017, the entire content of which is incorporated by reference in this application.

FIELD OF THE INVENTION

The present invention relates to a crude oil recovery chemical fluid excellent in resistance to high temperature and salt with a high crude oil recovery ratio for use in surfactant flooding of the "enhanced oil recovery" (hereinafter abbreviated as "EOR") process for recovering crude oil through injection into oil reservoirs in inland or subsea oil fields.

BACKGROUND OF THE INVENTION

In the process of recovering (collecting) crude oil from oil reservoirs, different recovery processes are applied in time series, that is, a three-step method including primary, secondary, and tertiary (or EOR (enhanced)) processes is applied.

The primary recovery method includes: natural flowing using natural pressure of oil reservoirs and gravity; and artificial lifting using artificial recovery techniques such as pumps. The crude oil recovery ratio of the primary recovery carried out by these methods in combination is said to be about 20% at maximum. The secondary recovery method includes water flooding and pressure maintenance, which are intended to restore oil reservoir pressure and to increase oil production by injecting water or natural gas after the production decreases in the primary recovery method. With these primary and secondary recovery methods in combination, the crude oil recovery ratio is about 40%, and a large amount of crude oil remains in the underground oil reservoir. The tertiary recovery method is then proposed, which is a method of recovering crude oil through the EOR process, to recover more crude oil further from the oil reservoir in which crude oil has already been collected from an easy-to-recover section.

The EOR process includes thermal flood, gas flood, microbial EOR, and chemical flood. The chemical flood, including polymer flooding, surfactant flooding, micellar flooding, is a process for improving the crude oil recovery ratio by pressing a chemical fluid suited for the purpose into an oil reservoir to enhance flowability of crude oil, reducing surface tension acting between water and oil, or creating a micellar state between the pressed gas and oil.

Surfactant flooding is a process of pressing a series of fluids including a fluid mainly composed of a surfactant into an oil reservoir to reduce the interfacial tension between crude oil and water to extract and collect the trapped crude oil by capillarity. In this process, for example, alkyl aryl sulfonate is singly used as a surfactant, or alkyl aryl sulfonate is used in combination with an auxiliary surfactant and/or an auxiliary agent. Alkyl aryl sulfonate is generally used because it can not only reduce the interfacial tension between oil and water but also exhibit behaviors of a variety of phases when used in combination with various salt concentrations, as described later. More specifically, at a low salt concentration, alkyl aryl sulfonate remains in the aqueous phase, whereas at a high salt concentration, it tends to remain in the oil phase. At a middle salt concentration, it is known that a microemulsion is formed, so that a considerable amount of oil and saltwater are present in the microemulsion phase to exhibit high crude oil recovery capability.

Micellar flooding is an oil recovery process in which a microemulsion is produced from water and crude oil, and the microemulsion called a micelle solution is injected to underground reservoirs. Many surfactants are disclosed for producing a micelle solution, see U.S. Pat. No. 3,506,070 "Use of Water-External Micellar Dispersions in Oil Recovery", issued Apr. 14, 1970 to Marathon Oil Corporation and U.S. Pat. No. 3,613,786, "Oil Recovery Method Using High Water Content Oil-External Micellar Dispersion, issued on Oct. 19, 1971 to Marathon Oil Company and U.S. Pat. No. 3,740,343 ":" High Water Content Oil-Dispersion Micellar Dispersions" issued Jun. 19, 1973 to Marathon Oil Company.

As a surfactant used in this process, a variety of anionic, nonionic, and cationic surfactants are disclosed, such as petroleum sulfonates, alkyl aryl sulfonates, alkanesulfonates, polyoxyethylene alkyl ether sulfates, polyoxyethylene alkyl ethers, polyoxyethylene alkyl phenyl ethers, polyhydric alcohol fatty acid esters, and alkyl trimethyl ammonium salts.

A micelle solution for use in the recovery of oil is disclosed, which includes internal olefin sulfonate having 10 to 30 carbon atoms and $\alpha$-olefin sulfonate having 10 to 30 carbon atoms (see Japanese Examined Patent Application Publication No. 1-35157).

One of conventional polymer flooding techniques, micellar polymer flooding involving pressing of both micellar slug (a mixture of petroleum sulfonate, auxiliary agent, seawater, and oil) and polymer fails to achieve a stable crude oil recovery ratio. Then, a chemical for crude oil recovery is proposed, which includes: a nonionic surfactant including an amide compound such as a reaction product of a fatty acid and an alkanolamine, and an alkylene oxide adduct thereof; and a water-soluble polymer. It is disclosed that a high crude oil recovery ratio is stably obtained (see Japanese Examined Patent Application Publication No. 5-86989).

Furthermore, a certain alkylxylene sulfonate is proposed as a surfactant for EOR with a low interfacial tension (see Japanese Patent No. 5026264).

U.S. Published Patent Application No. 2010/0096139, "Method for Intervention Operations in Subsurface Hydrocarbon Formations", assigned to assigned to Frac Tech Services, Ltd. and Illinois Institute of Technology. discloses a method of efficiently removing oil drops adhering to the rock surface by injecting nanoparticles mixed in a wetting agent in an aqueous or hydrocarbon carrier fluid into hydrocarbon reservoirs or wells to enhance disjoining pressure. The nanoparticles have a particle size in the range of 1 to 100 nm (for example, silicon dioxide). The nanoparticles are mixed in a wetting agent in an aqueous or hydrocarbon carrier fluid which includes an $\alpha$-olefin sulfonate. This fluid comprising nanoparticles is then injected into a hydrocarbon reservoir or well. To even further develop this effect, stability of nanoparticles in the wetting agent is required. This requirement, however, needs heat resistance of the wetting agent comprising nanoparticles. Moreover, to fulfill the effect in subsea hydrocarbon reservoirs or wells, salt resistance of the wetting agent comprising nanoparticles is also required. A method for improving recovery of crude oil, gas, and water from a hydrocarbon reservoir or well is disclosed. In this method, nanoparticles in the range of 1 to 100 nm (for example, silicon dioxide) mixed in a wetting agent in an aqueous or hydrocarbon carrier fluid including an α-olefin sulfonate are injected into a hydrocarbon reservoir or well.

On the other hand, an anode deposition-type electrodeposition coating material composition is disclosed, which includes: an acrylic polycarboxylic acid resin, for example, neutralized with amine or ammonium; a hardener; and a colloidal silica surface-treated with a silane coupling agent (see Japanese Patent No. 4033970).

In order to even further develop effective fluid treatments, stability of nanoparticles in the wetting agent is required. This requirement, however, needs heat resistance of the wetting agent comprising nanoparticles. Moreover, to fulfill the effect in subsea hydrocarbon reservoirs or wells, salt resistance of the wetting agent comprising nanoparticles is also required.

The presence of an anionic surfactant having an effect of removing crude oil adhering to sandstones or rocks such as carbonate rock or the like in subsurface or subsea oil reservoirs is essential for improving crude oil recoverability of a crude oil recovery chemical fluid. However, as the anionic surfactant has poor resistance to high temperature and salt, it is decomposed in a short time by injecting it into oil reservoirs having a high temperature and salt concentration, and thus it cannot exert fully crude oil recovery effect. In addition, although it is said that colloidal silica has crude oil recovery effect, the colloidal silica itself also has poor resistance to high temperature and salt, it becomes a gel in a short time by injecting it into oil reservoirs having a high temperature and salt concentration, and thus it cannot exert fully crude oil recovery effect.

Therefore, there has been a demand for crude oil recovery chemicals that can simultaneously achieve heat resistance and salt resistance and implement efficient crude oil recovery. Particularly, crude oil recovery chemical fluids are often collected several months after they are injected into the subsurface or subsea oil reservoirs. There has been a demand for the chemicals which can exhibit crude oil recovery effect and are stable even under unusual and severe environments being exposed to seawater or a saltwater comprising sodium ion, potassium ion and chlorine ion, and the like in a high concentration at a high temperature such as 100° C., over several months.

SUMMARY OF THE INVENTION

The first aspect of the instant claimed inventions is a crude oil recovery chemical fluid which exhibits excellent resistance to high temperature and salt, comprising a silane compound, an aqueous silica sol having an average particle diameter of from about 3 to about 200 nm, two or more anionic surfactants, and one or more nonionic surfactants.

The second aspect of the instant claimed invention is a crude oil recovery chemical fluid according to the first aspect of the instant claimed invention, wherein the aqueous silica sol contains silica particles in which at least a part of the silane compound is bonded on the surface of at least a part of the silica particles in the sol.

The third aspect of the instant claimed invention is a crude oil recovery chemical fluid according to the first or second aspect of the instant claimed invention, wherein the silane compound is selected from the group consisting of a silane coupling agent having at least one organic functional group, wherein the organic functional group is selected from the group consisting of a vinyl group, an ether group, an epoxy group, a styryl group, a methacryl group, an acryl group, an amino group, an isocyanurate group, an alkoxysilane, a silazane and a siloxane.

The fourth aspect of the instant claimed inventions is a crude oil recovery chemical fluid according to any one of the first, second or third aspect of the invention, wherein the aqueous silica sol is present in an amount of from about 0.01% by mass to about 30% by mass, based on the total mass of the crude oil recovery chemical fluid, in terms of silica solid content.

The fifth aspect of the instant claimed invention is a crude oil recovery chemical fluid according to any one of the first, second, third or fourth aspects of the invention, wherein the silane compound is present in a ratio of from about 0.1 to about 10.0 of silane compound based on the mass of silica solid content of the aqueous silica sol.

The sixth aspect of the instant claimed invention is a crude oil recovery chemical fluid according to the first, second, third, fourth or fifth aspects of the instant claimed invention, wherein the anionic surfactants are selected from the group consisting of a sodium salt or a potassium salt of a fatty acid, an alkylbenzene sulfonate, a higher alcohol sulfate ester salt, a polyoxyethylene alkyl ether sulfate, an α-sulfo fatty acid ester, an α-olefin sulfonate, a monoalkyl phosphate ester salt, and an alkane sulfone acid salt.

The seventh aspect of the instant claimed invention is a crude oil recovery chemical fluid according to any one of the first, second, third, fourth, fifth or sixth aspects of the invention, wherein the anionic surfactants are present in an amount of from about 0.001% by mass to about 20% by mass, based on the total mass of the crude oil recovery chemical fluid.

The eighth aspect of the instant claimed invention is a crude oil recovery chemical fluid according to any one of first, second, third, fourth, fifth, sixth or seventh aspects of the invention, wherein the anionic surfactants are present in a mass ratio of from about 0.4 to about 5.0 based on the silica solid content of the crude oil recovery chemical fluid, and the crude oil recovery chemical fluid has a pH of from about 7 about 12.

The ninth aspect of the instant claimed invention is a crude oil recovery chemical fluid according to any one of the first, second, third, fourth, fifth, sixth, seventh or eighth aspects of the instant claimed invention, wherein the anionic surfactants are present in a mass ratio of from about 0.001 to about 0.4 based on the silica solid content of the crude oil recovery chemical fluid, and the crude oil recovery chemical fluid has a pH of from about 2 to about 7.

The tenth aspect of the instant claimed invention is a crude oil recovery chemical fluid which exhibits excellent resistance to high temperature and salt according to any one of the first, second, third, fourth, fifth, sixth, seventh, eighth and ninth aspects of the instant claimed invention, wherein the nonionic surfactants have an HLB of from about 3.0 to about 20.0 or less, and are selected from the group consisting of polyoxyethylene alkyl ether, polyoxyethylene alkylphenol ether, alkyl glucoside, polyoxyethylene fatty acid ester, sucrose fatty acid ester, sorbitan fatty acid ester, polyoxyethylene sorbitan fatty acid ester and fatty acid alkanolamide.

The eleventh aspect of the instant claimed invention is a crude oil recovery chemical fluid which exhibits excellent resistance to high temperature and salt according to any one of the first, second, third, fourth, fifth, sixth, seventh, eighth, ninth or tenth aspects of the instant claimed invention, wherein the nonionic surfactants are present in an amount of from about 0.001% by mass to about 30% by mass, based on the total mass of the crude oil recovery chemical fluid.

The twelfth aspect of the instant claimed invention is a process for recovering crude oil from subsurface hydrocarbon comprising layer, comprising the steps of:
(a) a step of pressing a crude oil recovery chemical fluid comprising
a silane compound,
an aqueous silica sol having an average particle diameter of from about 3 nm to about 200 nm,
two or more anionic surfactants, and
one or more nonionic surfactants into subsurface layer; and
(b) a step of recovering crude oil from a production well together with the chemical fluid which was pressed into the subsurface layer.

The thirteenth aspect of the instant claimed invention is a process according to the twelfth aspect of the instant claimed invention, wherein the crude oil recovery chemical fluid has a pH of from about 7 to about 12, and the anionic surfactants are present in a mass ratio of 0.4 or more to less than 5.0 based on the silica solid content of the crude oil recovery chemical fluid.

The fourteenth aspect of the instant claimed invention is a process according to the twelfth aspect of the instant claimed invention, wherein the crude oil recovery chemical fluid has a pH of from about 2 to about 7, and the anionic surfactants are present in a mass ratio of 0.001 or more to less than 0.4 based on the silica solid content of the crude oil recovery chemical fluid.

The fifteenth aspect of the instant claimed invention is a crude oil recovery chemical solution which exhibits excellent resistance to high temperature and salt, comprising a silane compound, an aqueous silica sol having an average particle size of from about 3 nm to about 200 nm, two or more anionic surfactants, and one or more nonionic surfactants;
wherein the aqueous silica sol contains silica particles in which at least a part of the silane compound is bonded on the surface of at least a part of the silica particles in the sol;
wherein the silane compound is present in a ratio of from about 0.1 to about 10.0 of silane compound based on the mass of silica solid content of the aqueous silica sol; and
wherein the nonionic surfactants have an HLB of from about 11.0 to about 20.0 and wherein the nonionic surfactants are selected from the group consisting of polyoxyethylene alkyl ether, polyoxyethylene alkylphenol ether, alkyl glucoside, polyoxyethylene fatty acid ester, sucrose fatty acid ester, sorbitan fatty acid ester, polyoxyethylene sorbitan fatty acid ester and fatty acid alkanolamide; and
wherein the resistance to salt is determined by measuring the DLS average particle diameter before and after the chemical solution is exposed to salt.

The sixteenth aspect of the instant claimed invention is a crude oil recovery chemical solution of the fifteenth aspect of the instant claimed invention, wherein the silane compound is at least one compound selected from the group consisting of a silane coupling agent having at least one organic functional group, wherein the organic functional group is selected from the group consisting of vinyl group, ether group, epoxy group, styryl group, methacryl group, acryl group, amino group, isocyanurate group, alkoxysilane, silazane and siloxane.

The seventeenth aspect of the instant claimed invention is a crude oil recovery chemical solution according to the fifteenth or sixteenth aspect of the instant claimed invention, wherein the aqueous silica sol is present in an amount of from about 0.1% by mass to about 30% by mass, based on the total mass of the crude oil recovery chemical solution, in terms of silica solid content.

The eighteenth aspect of the instant claimed invention is a crude oil recovery chemical solution according to the fifteenth or sixteenth or seventeenth aspect of the instant claimed invention, wherein the anionic surfactants are selected from the group consisting of a sodium salt or a potassium salt of a fatty acid, an alkylbenzene sulfonate, a higher alcohol sulfate ester salt, a polyoxyethylene alkyl ether sulfate, an α-sulfo fatty acid ester, an α-olefin sulfonate, a monoalkyl phosphate ester salt, and an alkane sulfone acid salt.

The nineteenth aspect of the instant claimed invention is a crude oil recovery chemical solution according to the fifteenth or sixteenth or seventeenth or eighteenth aspect of the instant claimed invention, wherein the anionic surfactants are present in an amount of from about 0.001% by mass to about 20% by mass, based on the total mass of the crude oil recovery chemical solution.

The twentieth aspect of the instant claimed invention is a crude oil recovery chemical solution which exhibits excellent resistance to high temperature and salt according to according to the fifteenth, sixteenth, seventeenth, eighteenth, or nineteenth aspect of the instant claimed invention wherein the nonionic surfactants are present in an amount of from about 0.001% by mass to about 30% by mass, based on the total mass of the crude oil recovery chemical solution.

The twenty-first aspect of the instant claimed invention is a process for recovering crude oil from subsurface hydrocarbon comprising layer, comprising the steps of:
(a) inserting a crude oil recovery chemical solution comprising
a silane compound,
an aqueous silica sol,
two or more anionic surfactants, and
one or more nonionic surfactants;
into subsurface layer; and
(b) recovering crude oil from a production well by use of the chemical solution which was pressed into the subsurface layer;
wherein the aqueous silica sol contains silica particles in which at least a part of the silane compound is bonded on the surface of at least a part of the silica particles in the sol;
wherein the silane compound is present in a ratio of from about 0.1 to about 10.0 of silane compound based on the mass of silica solid content of the aqueous silica sol;
wherein the nonionic surfactants have an HLB of from about 11.0 to about 20.0, and
wherein the nonionic surfactants are selected from the group consisting of polyoxyethylene alkyl ether, polyoxyethylene alkylphenol ether, alkyl glucoside, polyoxyethylene fatty acid ester, sucrose fatty acid ester, sorbitan fatty acid ester, polyoxyethylene sorbitan fatty acid ester and fatty acid alkanolamide; and
wherein the aqueous silica sol has an average particle size of from about 3 nm to about 200 nm.

DETAILED DESCRIPTION OF THE INVENTION

The present invention is directed to a chemical fluid for use in surfactant flooding of the EOR process for recovering crude oil through injection into oil reservoirs in inland or subsea oil fields. More specifically, the problem to be solved by the invention is to provide a crude oil recovery chemical fluid excellent in resistance to high temperature and salt with a high crude oil recovery ratio.

One aspect of the instant claimed invention is a chemical fluid including specifically a combination of a silane compound, an aqueous silica sol having an average particle diameter of from about 3 to about 200 nm, two or more anionic surfactants, and one or more nonionic surfactants serves as a crude oil recovery chemical fluid excellent in heat resistance and salt resistance and excellent in crude oil recoverability.

Particularly, it has been found that the adjustment of pH of the crude oil recovery chemical fluid of the present invention from about 2 to about 7 provides a crude oil recovery chemical fluid which exhibits excellent resistance to high temperature and salt. This resistance to sale is not only for seawater but also for artificial seawater comprising as main components moieties such as sodium chloride, magnesium chloride, sodium sulfate and calcium chloride, all of which can be encountered in crude oil recovery.

More specifically, according to one embodiment, the present invention relates to a crude oil recovery chemical fluid which exhibits excellent resistance to high temperature and salt. This crude oil recovery chemical fluid is comprising a silane compound, an aqueous silica sol having an average particle diameter of from about 3 nm to about 200 nm, two or more anionic surfactants, and one or more nonionic surfactants.

According to another embodiment, in the crude oil recovery chemical fluid which exhibits excellent resistance to high temperature and salt, the aqueous silica sol contains silica particles in which at least a part of the silane compound is bonded on the surface of at least a part of the silica particles in the sol.

According to another embodiment, in the crude oil recovery chemical fluid which exhibits excellent resistance to high temperature and salt according to the first aspect or the second aspect, the silane compound is at least one compound selected from the group consisting of a silane coupling agent having at least one organic functional group, wherein the organic functional group is selected from the group consisting of vinyl group, ether group, epoxy group, styryl group, methacryl group, acryl group, amino group, and isocyanurate group, alkoxysilane, silazane, and siloxane.

According to another embodiment, in the crude oil recovery chemical fluid which exhibits excellent resistance to high temperature and salt according to any one of the first aspect to the third aspect, the aqueous silica sol is present in an amount of from about 0.01% by mass to about 30% by mass, based on the total mass of the crude oil recovery chemical fluid, in terms of silica solid content.

According to another embodiment, in the crude oil recovery chemical fluid which exhibits excellent resistance to high temperature and salt, the silane compound is present in a ratio of from about 0.1 to about 10.0 of silane compound based on the mass of silica solid content of the aqueous silica sol.

According to another embodiment, in the crude oil recovery chemical fluid which exhibits excellent resistance to high temperature and salt, the anionic surfactants are selected from the group consisting of a sodium salt or a potassium salt of a fatty acid, an alkylbenzene sulfonate, a higher alcohol sulfate ester salt, a polyoxyethylene alkyl ether sulfate, an α-sulfo fatty acid ester, an α-olefin sulfonate, a monoalkyl phosphate ester salt, and an alkane sulfone acid salt.

According to another embodiment, in the crude oil recovery chemical fluid which exhibits excellent resistance to high temperature and salt the anionic surfactants are present in an amount of from about 0.001% by mass to about 20% by mass, based on the total mass of the crude oil recovery chemical fluid.

According to another embodiment, in the crude oil recovery chemical fluid which exhibits excellent resistance to high temperature and the anionic surfactants are present in a mass ratio of from about 0.4 to about 5.0 based on the silica solid content of the crude oil recovery chemical fluid, and the crude oil recovery chemical fluid has a pH of from about 7 to about 12.

According to another embodiment, in the crude oil recovery chemical fluid which exhibits excellent resistance to high temperature and salt, the anionic surfactants are present in a mass ratio of from about 0.001 to about 0.4 based on the silica solid content of the crude oil recovery chemical fluid, and the crude oil recovery chemical fluid has a pH of from about 2 to about 7.

According to another embodiment, in the crude oil recovery chemical fluid which exhibits excellent resistance to high temperature and salt the nonionic surfactants have an HLB of from about 3.0 to about 20.0. The nonionic surfactants are selected from the group consisting of polyoxyethylene alkyl ether, polyoxyethylene alkylphenol ether, alkyl glucoside, polyoxyethylene fatty acid ester, sucrose fatty acid ester, sorbitan fatty acid ester, polyoxyethylene sorbitan fatty acid ester, and fatty acid alkanolamide.

According to another embodiment, in the crude oil recovery chemical fluid which exhibits excellent resistance to high temperature and salt, the nonionic surfactants are present in an amount of from about 0.001% by mass to about 30% by mass, based on the total mass of the crude oil recovery chemical fluid.

According to another embodiment, the present invention relates to a process for recovering crude oil from subsurface hydrocarbon comprising layer, comprising the steps of:

(a) pressing a crude oil recovery chemical fluid comprising a silane compound, an aqueous silica sol having an average particle diameter of from about 3 nm to about 200 nm, two or more anionic surfactants, and one or more nonionic surfactants into subsurface layer; and (b) recovering crude oil from a production well by use of the chemical fluid which was pressed into the subsurface layer.

According to another embodiment, in the preceding process he crude oil recovery chemical fluid has a pH of from about 7 to about 12, and the anionic surfactants are present in a mass ratio of from about 0.4 to about 5.0 based on the silica solid content of the crude oil recovery chemical fluid.

According to another embodiment, in the preceding process the crude oil recovery chemical fluid is set to a pH of from about 2 to about 7, and the anionic surfactants are present in a mass ratio of from about 0.001 to about 0.4 based on the silica solid content of the crude oil recovery chemical fluid.

The crude oil recovery chemical fluid of the present invention is excellent in resistance to high temperature and salt. In practice this means this fluid is a stable fluid, which does not cause any inconvenience such as gelation even when the chemical fluid is diluted with seawater or the like and injected into oil reservoirs in inland or subsea oil fields. Furthermore, the crude oil recovery chemical fluid of the present invention exerts an effect of removing crude oil, and further it is expected that the wedge effect of nanosilica particles included in the crude oil recovery chemical fluid of the present invention improves the effect of removing crude oil from rock surfaces, and the chemical fluid promises recovery of crude oil with a high recovery ratio.

The crude oil recovery chemical fluid of the present invention is comprising a silane compound, an aqueous silica sol having an average particle diameter of from about 3 nm to about 200 nm, two or more anionic surfactants, and one or more nonionic surfactants.

In one embodiment, the most suitable use of the crude oil recovery chemical fluid of the present invention can be selected by adjusting the pH from about 7 to about 12. In another embodiment, the most suitable use of the crude oil recovery chemical fluid of the present invention can be selected by adjusting the pH from about 2 to about 7.

The crude oil recovery chemical fluid having pH of from about 7 to about 12 exhibits an excellent resistance to high temperature and salt for a saltwater comprising chloride ion with sodium ion, calcium ion, magnesium ion and the like. This fluid is expected to be particularly useful in land subsurface oil reservoirs.

In contrast, the crude oil recovery chemical fluid having a pH of from about 2 to about 7 exhibits a very excellent resistance to high temperature and salt for seawater. This fluid is expected to be useful in underwater oil reservoirs in underwater fields.

The crude oil recovery chemical fluid of the present invention can obtain an excellent resistance to high temperature and salt even when the pH is about 12 by using an aqueous solution of alkali metal such as sodium hydroxide, potassium hydroxide or the like, ammonia water, or a basic amine aqueous solution.

It has been found that when the crude oil recovery chemical fluid has a pH of less than about 2, the stability of the aqueous silica sol, the anionic surfactants and the nonionic surfactant in the chemical fluid deteriorates, and there is a danger of causing gelation or decomposition, or the like. Therefore, fluid with a pH of less than about 2 should not be used.

In addition, it has been found that when the crude oil recovery chemical fluid has a pH greater than about 12, magnesium ion in seawater or artificial seawater causes neutralization with a water-soluble strong alkaline component in the chemical fluid to form magnesium hydroxide which is slightly soluble in water, and thus causes aggregation of the crude oil recovery chemical fluid. Therefore, the use of the fluid when the pH is greater than about 12 is also not preferable.

The aqueous silica sol refers to a colloidal dispersion system. In this colloidal dispersion system, there is an aqueous solvent used as a dispersion medium. There are also colloidal silica particles which may be referred to as a dispersoid. These colloidal silica particles are commercially manufactured by well-known methods using water glass (aqueous solution of sodium silicate) as a raw material. The average particle diameter of the aqueous silica sol refers to the average particle diameter of the colloidal silica particles serving as a dispersoid.

In the present invention, the average particle diameter of the aqueous silica sol (colloidal silica particles) refers to the specific surface diameter obtained by nitrogen adsorption (the BET method) or Sears' particle diameter, unless otherwise specified.

The average particle diameter (specific surface diameter) D (nm) is given by the formula $D (nm)=2720/S$, from the specific surface $S$ ($m^2/g$) measured by nitrogen adsorption.

The Sears' particle diameter is defined as the average particle diameter measured based on a test method described in the article "Rapid Determination of Particle Diameter of Colloidal Silica", by G. W. Sears, Anal. Chem. 28 (12), pp. 1981-1983, 1956. In detail, the Sears' particle diameter is a corresponding diameter (specific surface area diameter) calculated from a specific surface area of a colloidal silica measured from the amount of 0.1N—NaOH required for titrating the colloidal silica corresponding to 1.5 g of $SiO_2$ from pH 4 to pH 9.

In the present invention, the average particle diameter of the aqueous silica sol (colloidal silica particles) by nitrogen adsorption (the BET method) or Sears' particle diameter can be in the range of from about 3 nm to 200 nm, or in the range of from about 3 nm to about 150 nm, or in the range of from about 3 nm to 100 nm, or in the range of from about 3 nm to about 30 nm.

Then, whether the silica particles in the aqueous silica sol are dispersed or coagulated can be determined by measuring the average particle diameter by dynamic light scattering (DLS average particle diameter) for silica particles of the silica sol in the chemical fluid.

The DLS average particle diameter represents the average value of secondary particle diameter (dispersed particle diameter), and it is said that the DLS average particle diameter in a completely dispersed state is about twice the average particle diameter (which represents the average value of primary particle diameter in terms of specific surface diameter obtained through measurement by nitrogen adsorption (BET method) or Sears' particle diameter). It then can be determined that as the DLS average particle diameter increases, the silica particles in the aqueous silica sol is more coagulated.

For example, as an example of the aqueous silica sol, an aqueous silica sol, SNOWTEX® ST-O, manufactured by Nissan Chemical Corporation, has an average particle diameter (BET method) of 10-11 nm and a DLS average particle diameter of 15-20 nm. In Examples mentioned below, a high temperature and salt resistance evaluation sample of the crude oil recovery chemical fluid comprising this aqueous silica sol has a DLS average particle diameter of 25 nm or less and this result exhibits that the silica particles are in almost dispersed state in the chemical fluid.

In a case where the chemical fluid has a good resistance to high temperature and salt, the DLS average particle diameter after a high temperature and salt resistance test is almost the same as the DLS average particle diameter of the chemical fluid. For example, if the ratio of the DLS average particle diameter after a high temperature and salt resistance test/the DLS average particle diameter of the chemical fluid is 1.1 or less, it shows that the chemical fluid after a high temperature and salt resistance test maintains the similar dispersion state as that of the chemical fluid. However, when the resistance to high temperature and salt of the chemical fluid is poor, the DLS particle diameter after a high temperature and salt resistance test is much larger, showing that the chemical fluid is in a coagulated state.

In the crude oil recovery chemical fluid of the present invention, if the ratio of the DLS average particle diameter after a high temperature and salt resistance test/the DLS average particle diameter of the chemical fluid is 1.5 or less (ratio of change of average particle diameter is 50% or less), it can be judged that the resistance to high temperature and salt is good, particularly the chemical fluid having the ratio of 1.1 or less (ratio of change of average particle diameter is 10% or less) has no degradation of silica sol, and thus can be judged that the resistance to high temperature and salt is very good.

In the present invention, the average particle diameter of the aqueous silica sol is from about 3 nm to about 200 nm, in another embodiment it is from about 3 nm to about 150 nm, in another embodiment it is from about 3 nm to about 100 nm, and in another embodiment is it from about 3 nm to about 30 nm in the measurement by nitrogen adsorption (BET method) or Sears' method. The average particle diameter smaller than about 3 nm is not preferable, because if this small of a particle is used in the fluid, the chemical fluid has been found to be unstable. The average particle diameter larger than about 200 nm is not recommended, because if this large of a particle is present in the fluid, the pores on the sandstones or carbonate rocks present in underground oil fields are blocked and thus oil recoverability becomes worse.

The silica ($SiO_2$) concentration in the aqueous silica sol used is preferably from about 5% to about 55% by mass.

In the present invention, commercially available products can be used for the aqueous silica sol. Those having a silica concentration from about 5% to about 55% by mass ss in an aqueous silica sol are recommended because they are commercially available and can be easily obtained.

Either alkaline or acidic aqueous silica sol can be used as the aqueous silica sol, and acidic aqueous silica sol is preferable.

Examples of the commercially available acidic aqueous silica sol include SNOWTEX® ST-OXS, SNOWTEX® ST-OS, SNOWTEX® ST-O, SNOWTEX (ST-O-40, SNOWTEX® ST-OL, SNOWTEX® ST-OYL and SNOWTEX® OZL-35, commercial products, available from Nissan Chemical Corporation, having offices at 5-1, Nihonbashi 2-Chome, Chuo-ku, Tokyo 103-6119, JAPAN.

In the present invention, in an embodiment, the aqueous silica sol is present in an amount of from about 0.01% by mass to about 30.0% by mass, in another embodiment it is present in an amount of from about 10.0% by mass to about 25.0% by mass, in another embodiment, it is present in an amount of from about 15.0% by mass to about 25.0% by mass, based on the total mass of the crude oil recovery chemical fluid, in terms of silica solid content.

As will be described later, in the crude oil recovery chemical fluid of the present invention, at least a part of the silane compound described later may be bonded on the surface of a part of the silica particles in the aqueous silica sol.

The particle diameter of the silica particles having the silane compound bonded on the surface thereof in the aqueous silica sol can be easily measured as the dynamic light scattering particle diameter as described above with a commercially available apparatus.

Suitable silane compounds include a silane coupling agent having at least one group selected from the group consisting of vinyl group, ether group, epoxy group, styryl group, methacryl group, acryl group, amino group, and isocyanurate group as an organic functional group, as well as alkoxysilane, silazane, and siloxane.

Suitable silane coupling agents having a vinyl group or styryl group are selected from the group consisting of vinyltrichlorosilane, vinyltrimethoxysilane, vinyltriethoxysilane, vinyl-tris(2-methoxyethoxy)silane, vinylmethyldimethoxysilane, vinyltriacetoxysilane, allyltrichlorosilane, allyltrimethoxysilane, allyltriethoxysilane, and p-styryltrimethoxysilane.

Suitable silane coupling agents having epoxy group are selected from the group consisting of 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl)propyltrimethoxysilane, 2-(3,4-epoxycyclohexyl)propyltriethoxysilane, 2-(3,4-epoxycyclohexyl)ethyltrimethoxysilane, 2-(3,4-epoxycyclohexyl)ethyltriethoxysilane, 2-(3,4-epoxycyclohexyl)methyltrimethoxysilane, 2-(3,4-epoxycyclohexyl)methyltriethoxysilane, [(3-ethyl-3-oxethanyl)methoxy]propyltrimethoxysilane, and [(3-ethyl-3-oxethanyl)methoxy]propyltriethoxysilane.

Suitable silane coupling agents having methacryl group (methacryloyl group) or acryl group (acryloyl group) are selected from the group consisting of 3-methacryloyloxypropyltrimethoxysilane, 3-methacryloyloxypropyltriethoxysilane, 3-methacryloyloxypropylmethyldimethoxysilane, 3-methacryloyloxypropylmethyldiethoxysilane, 3-acryloyloxypropyltrimethoxysilane, and 3-acryloyloxypropyltriethoxysilane.

Suitable silane coupling agents having an amino group are selected from the group consisting of N-2-(aminoethyl)-3-aminopropylmethyldimethoxysilane, N-2-(aminoethyl)-3-aminopropyltrimethoxysilane, 3-aminopropyltrichlorosilane, 3-aminopropyltrimethoxysilane, 3-aminopropyltriethoxysilane, 3-aminopropylmethyldimethoxysilane, 3-aminopropylmethyldiethoxysilane, 3-triethoxysilyl-N-(1,3-dimethyl-butylidene)propylamine, N-phenyl-3-aminopropyltrimethoxysilane, and N-phenyl-3-aminopropyltriethoxysilane.

Suitable silane coupling agents having isocyanurate group are selected from the group consisting of tris-(3-trimethoxysilylpropyl) isocyanurate and tris-(3-triethoxysilylpropyl) isocyanurate.

Suitable silane coupling agents having isocyanate group are selected from the group consisting of 3-isocyanatepropyltriethoxysilane and 3-isocyanatepropyltrimethoxysilane.

Suitable alkoxysilanes are selected from the group consisting of methyltrimethoxysilane, methyltriethoxysilane, dimethyldimethoxysilane, dimethyldiethoxysilane, trimethylmethoxysilane, ethyltrimethoxysilane, tetraethoxysilane, n-propyltriethoxysilane, isobutyltrimethoxysilane, isobutyltriethoxysilane, phenyltrimethoxysilane, phenyltriethoxysilane, diphenyldimethoxysilane, diphenyldiethoxysilane, n-propyltrimethoxysilane, n-hexyltrimethoxysilane, n-hexyltriethoxysilane, cyclohexylmethyldimethoxysilane, n-octyltriethoxysilane, and n-decyltrimethoxysilane; in addition silazanes such as hexamethyldisilazane; and siloxane such as methylmethoxysiloxane and dimethyl-phenylmethoxysiloxane can be used.

Among those silane compounds, an amphiphilic silane coupling agent having a functional group such as ether group, epoxy group, methacryl group, and acryl group has been found to be useful.

Suitable silane coupling agents with the desired functional groups are selected from the group consisting of 3-glycidoxypropyltrimethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl)ethyltrimethoxysilane, 3-methacryloyloxypropyltrimethoxysilane, 3-methacryloyloxypropylmethyldimethoxysilane, 3-methacryloyloxypropyltriethoxysilane, 3-methacryloyloxypropylmethyldiethoxysilane, and 3-acryloyloxypropyltrimethoxysilane.

In the crude oil recovery chemical fluid of the present invention, in an embodiment the silane compound is added in a ratio of silane compound/aqueous silica sol (silica:$SiO_2$)= 0.1 to 10.0 based on the mass of silica solid content, that is, silica particles in the aqueous silica sol. In another embodiment the silane compound is added in a ratio by mass of 0.1 to 5.0.

The ratio less than 0.1 of the silane compound based on the mass of silica particles in the aqueous silica sol is not recommended, because if used, the resistance to high temperature and salt of the chemical fluid may be poor. With the ratio greater than 10.0, that is, even when a large amount of the silane compound is added, no further improvement of the effect can be expected.

In the crude oil recovery chemical fluid of the present invention, at least a part of the silane compound may be bonded on the surface of at least a part of the silica particles in the aqueous silica sol. The silica particles in which the silane compound is bonded on a part of the surface include, for example, silica particles having a surface coated with the silane compound. The use of silica particles in which the silane compound is bonded on at least a part of the surface, for example, silica particles having a surface coated with the silane compound, can further improve the resistance to high temperature and salt of the crude oil recovery chemical fluid.

In an embodiment of the crude oil recovery chemical fluid of the present invention, the aqueous silica sol includes silica particles in which at least a part of the silane compound is bonded on the surface of at least a part of the silica particles in the sol.

The silica particles in which at least a part of the silane compound is bonded on the surface of at least a part of the silica particles (hereinafter also called silica particles surface-treated with the silane compound) can be obtained by (a) adding a silane compound to an aqueous silica sol in a ratio of from about 0.1 to about 3.0 of the silane compound, based on the mass of the silane compound in terms of the silica particles (silica solid content) in the aqueous silica sol, and (b) heating from about 50° C. to about 100° C. for from about 1 hour to about 20 hours.

Here, the amount of surface treatment with the silane compound, that is, the silane compound bonded to the silica particle surface is in an embodiment from about 2 to 12 per square nanometer ($nm^2$) of the silica particle surface.

The heating temperature lower than about 50° C. is not recommended, because if so, the rate of partial hydrolysis is slow, and the efficiency of surface treatment is poor. On the other hand, the heating temperature higher than 100° C. is not recommended, because if so, a dry gel of silica is produced.

When the heating time is shorter than about 1 hour, the partial hydrolysis reaction of the silane compound is insufficient. The heating time may not be longer than about 20 hours, because if so, the partial hydrolysis reaction of the silane compound is then almost saturated.

In the crude oil recovery chemical fluid of the present invention, two or more anionic surfactants are used. For example, two to five anionic surfactants, or two to four anionic surfactants, or two to three anionic surfactants, or two anionic surfactants can be combined.

In the present invention, a chemical fluid comprising two or more anionic surfactants achieves the wanted effect much better than a chemical fluid comprising one anionic surfactant alone. It is believed, without intending to be bound thereby that the surfactants intrude into each other to form a denser micelle (packing effect), thereby stabilizing the surfactants themselves. Consequently, the anionic surfactants become stable to maintain crude oil recovery effect. The chemical fluid of the present invention aims at stabilizing the chemical fluid which is expected to use in a saltwater at a high temperature for crude oil recovery by use of the packing effect due to mixing of plural surfactants. The idea in which the packing effect of using multiple surfactants is used in a saltwater at a high temperature atmosphere to recover more oil has not previously been proposed.

Suitable anionic surfactants include a sodium salt or a potassium salt of a fatty acid, an alkylbenzene sulfonate, a higher alcohol sulfate ester salt, a polyoxyethylene alkyl ether sulfate, an α-sulfo fatty acid ester, an α-olefin sulfonate, a monoalkyl phosphate ester salt, and an alkane sulfone acid salt.

Suitable alkylbenzene sulfonates include sodium salts, potassium salts, and lithium salts, such as C10 to C16 sodium alkylbenzenesulfonate, C10 to C16 alkylbenzenesulfonate, and sodium alkylnaphthalenesulfonate.

Suitable higher alcohol sulfate ester salts include sodium dodecyl sulfate having a carbon atom number of 12 (sodium lauryl sulfate), triethanolamine lauryl sulfate, and triethanolammonium lauryl sulfate.

Suitable polyoxyethylene alkyl ether sulfate include sodium polyoxyethylene styrenated phenyl ether sulfate, ammonium polyoxyethylene styrenated phenyl ether sulfate, sodium polyoxyethylene decyl ether sulfate, ammonium polyoxyethylenedecyl ether sulfate, sodium polyoxyethylene lauryl ether sulfate, ammonium polyoxyethylene lauryl ether sulfate, sodium polyoxyethylene tridecyl ether sulfate, and sodium polyoxyethylene oleyl cetyl ether sulfate.

Suitable α-olefin sulfonates include, but are not limited to, sodium α-olefin sulfonate.

Suitable alkane sulfonates include, but are not limited to, sodium 2-ethylhexyl sulfate.

In an embodiment, an α-olefin sulfonate and a higher alcohol sulfate ester salt are used in combination as the anionic surfactants. In this case, the ratio between an α-olefin sulfonate and a higher alcohol sulfate ester salt is, for example, but not limited to, α-olefin sulfonate:higher alcohol sulfate ester salt=5:1 to 1:5, for example, 3:1 to 1:3, 2:1 to 1:3, or 1:1 to 1:2, in terms of molar ratio.

In an embodiment, the anionic surfactants are present in an amount of from about 0.001% by mass to about 20% by mass in total, based on the total mass of the crude oil recovery chemical fluid. An amount less than 0.001% by mass is not recommended, because if used, the resistance to high temperature and salt of the chemical fluid and the crude oil recoverability are poor. An amount greater than 20% by mass is not recommended, because if it is used, the recovered oil and the surfactants form an emulsion and thus it becomes difficult to separate the oil and the surfactants.

As mentioned above, in an embodiment, the most suitable use of the crude oil recovery chemical fluid of the present invention can be selected by adjusting the pH from about 7 to about 12. In another embodiment, the most suitable use of the crude oil recovery chemical fluid of the present invention can be selected by adjusting the pH from about 2 to about 7. In the adjustment of pH, the adjustment of the amount of the anionic surfactants provides a chemical fluid excellent in a resistance to high temperature and salt.

In an embodiment, where the crude oil recovery chemical fluid has a pH from about 7 to about 12, the anionic surfactants are present in a mass ratio of 0.4 or more to less than 5.0 based on the silica solid content of the crude oil recovery chemical fluid.

In an embodiment, where the crude oil recovery chemical fluid has a pH from about 2 to about 7, the anionic surfactants are present in a mass ratio of 0.001 or more to less than 0.4 based on the silica solid content of the crude oil recovery chemical fluid.

In the crude oil recovery chemical fluid of the present invention, one or more nonionic surfactants are used in addition to the two anionic surfactants. For example, a combination of one to five nonionic surfactants, or one to four nonionic surfactants, or one to three nonionic surfactants, or one to two nonionic surfactants, or one nonionic surfactant can be used.

In the present invention, a chemical fluid comprising both the anionic surfactants and the nonionic surfactant achieves better results than using a chemical fluid comprising two or more anionic surfactants alone. It is believed, without intending to be bound thereby that the anionic surfactants and the nonionic surfactant intrude into each other to form a denser micelle, thereby stabilizing the surfactants themselves. Consequently, the anionic surfactants and the nonionic surfactant become stable to maintain crude oil recovery effect.

In the present invention, the nonionic surfactants are selected from the group consisting of polyoxyethylene alkyl ether, polyoxyethylene alkylphenol ether, alkyl glucoside, polyoxyethylene fatty acid ester, sucrose fatty acid ester, sorbitan fatty acid ester, polyoxyethylene sorbitan fatty acid ester, and fatty acid alkanolamide.

Suitable polyoxyethylene alkyl ethers include polyoxyethylene dodecyl ether (polyoxyethylene lauryl ether), polyoxyalkylene lauryl ether, polyoxyethylene tridecyl ether, polyoxyalkylene tridecyl ether, polyoxyethylene myristyl ether, polyoxyethylene cetyl ether, polyoxyethylene oleyl ether, polyoxyethylene stearyl ether, polyoxyethylene behenyl ether, polyoxyethylene-2-ethylhexyl ether, and polyoxyethylene isodecyl ether.

Suitable polyoxyethylene alkylphenol ethers include polyoxyethylene styrenated phenyl ether, polyoxyethylene nonylphenyl ether, polyoxyethylene di-styrenated phenyl ether, and polyoxyethylene tribenzyl phenyl ether.

Suitable alkyl glucosides include decyl glucoside and lauryl glucoside.

Suitable polyoxyethylene fatty acid esters include polyoxyethylene monolaurate, polyoxyethylene monostearate, polyoxyethylene monooleate, polyethylene glycol distearate, polyethylene glycol dioleate, and polypropylene glycol dioleate.

Suitable sorbitan fatty acid esters include sorbitan monocaprylate, sorbitan monolaurate, sorbitan monomyristate, sorbitan nonpalmate, sorbitan monostearate, sorbitan distearate, sorbitan tristearate, sorbitan monooleate, sorbitan trioleate, sorbitan monosesquioleate, and ethylene oxide adducts thereof.

Suitable polyoxyethylene sorbitan fatty acid esters include polyoxyethylene sorbitan monolaurate, polyoxyethylene sorbitan monoamidite, polyoxyethylene sorbitan monostearate, polyoxyethylene sorbitan tristearate, polyoxyethylene sorbitan monooleate, polyoxyethylene sorbitan trioleate, and polyoxyethylene sorbitan triisostearate.

Suitable fatty acid alkanolamides include coconut fatty acid diethanolamide, tallow acid diethanolamide, lauric acid diethanolamide, and oleic acid diethanolamide.

In an embodiment, polyoxyalkyl ether or polyoxyalkyl glycol such as polyoxyethylene polyoxypropylene glycol and polyoxyethylene fatty acid ester, polyoxyethylene hydrogenated castor oil ether, sorbitan fatty acid ester alkyl ether, alkyl polyglucoside, sorbitan monooleate, and sucrose fatty acid ester can also be used.

Among the nonionic surfactants, polyoxyethylene alkyl ether and polyoxyethylene alkylphenol ether are recommended because the resistance to high temperature and salt of the chemical fluid is good.

The value of HLB of the nonionic surfactants is a value indicating a balance between hydrophobicity and hydrophilicity, with the HLB of a substance having no hydrophilic group being 0, and the HLB of a substance having no hydrophobic group and only hydrophilic groups being 20.

In the present invention, in an embodiment, the nonionic surfactants have an HLB of from about 3.0 to about 20.0. From the standpoint of a resistance to high temperature and salt of the chemical fluid, in an embodiment, the HLB of the nonionic surfactants is from about 10.0 to about 20.0. From the standpoint of human and environment safety, it is recommended to use the nonionic surfactants having an HLB of from about 14.0 to about 20.0 because there is no concern for endocrine disruptor, and there is no concern for so-called environmental hormones. In addition, in a case where two or more nonionic surfactants are used, it is preferable to adjust an HLB of the mixture calculated from each HLB and weight average of mixed ratio from about 10.0 to about 20.0.

When an HLB is less than 3, as the nonionic surfactant has a strong hydrophobicity, the aqueous silica sol and the water-soluble anionic surfactants and the nonionic surfactant are not miscible in each other, and thus they separate into two phases. Therefore, an HLB less than 3.0 is not recommended.

In an embodiment, the nonionic surfactants are present in an amount of from about 0.001% by mass to about 30% by mass based on the total mass of the crude oil recovery chemical fluid. The amount less than 0.001% by mass is not recommended, because if so, the heat resistance and the salt resistance of the chemical fluid are poor. The amount greater than 30% by mass is not recommended, because if so, the viscosity of the chemical fluid is extremely high.

Either of the chemical fluid comprising one nonionic surfactant alone or the chemical fluid comprising two or more to five or less nonionic surfactants is excellent in resistance to high temperature and salt and achieves good crude oil recoverability.

In order to enhance the viscosity of the chemical fluid, a thickener, selected from the group consisting of a water-soluble polymer hydroxyethyl cellulose and a salt thereof, hydroxypropylmethyl cellulose and a salt thereof, carboxymethyl cellulose and a salt thereof, pectin, guar gum xanthan gum, tamarind gum, carrageenan, and the like may be further added.

It is believed, without intending to be bound thereby, that in the crude oil recovery chemical fluid of the present invention, the phase solubility between the silica particles in the aqueous silica sol and the surfactant is thought to be improved by the use of the aqueous silica sol and the silane compound in combination, and in particular, by inclusion of silica particles in which at least a part of the silane compound is bonded on the surface of a part thereof, as silica particles in the aqueous silica sol. Furthermore, two or more anionic surfactants are combined with one or more nonionic surfactants whereby the surfactants intrude into each other to form a denser micelle, thereby stabilizing the surfactants themselves. This is thought to be the reason why the crude oil recovery chemical fluid is excellent in resistance to high temperature and salt.

The process of recovering crude oil from subsurface hydrocarbon comprising layer using the crude oil recovery chemical fluid of the present invention comprises the steps of:

(a) pressing the crude oil recovery chemical fluid of the present invention into subsurface layer and (b) recovering crude oil from a production well together with the chemical fluid which was pressed into the subsurface layer.

In the process, in a case where the crude oil recovery chemical fluid has a pH of from about 7 to about 12, and the anionic surfactants are present in a mass ratio of from about 0.4 to about 5.0 based on the silica solid content of the aqueous silica sol, the obtained crude oil recovery chemical fluid has an excellent resistance to high temperature and salt, and thus is expected to have a high crude oil recovery capability.

In a process where the crude oil recovery chemical fluid has a pH of from about 2 to about 7, and the anionic surfactants are present in a mass ratio of from about 0.001 to about 0.4 based on the silica solid content of the aqueous silica sol, the obtained crude oil recovery chemical fluid has an excellent resistance to high temperature and salt, and thus is expected to have a high crude oil recovery capability.

EXAMPLE

Although a detailed description will be given below based on Synthesis Examples, Examples, Comparative Examples, and Reference Example, the present invention is not limited by these examples.

The analysis (pH, electrical conductivity, DLS average particle diameter) of the aqueous silica sols prepared in Synthesis Examples, as well as the analysis (pH, electrical conductivity, viscosity, DLS average particle diameter) of the chemical fluid s produced in Examples and Comparative Examples, and the analysis of the samples after a high temperature and salt resistance test for the samples prepared using the chemical fluid s are performed using the following apparatuses.

DLS average particle diameter (dynamic light scattering particle diameter): a dynamic light scattering particle diameter measurement apparatus Zetasizer Nano (manufactured by Spectris Co., Ltd., Malvern Instruments) was used.

pH: a pH meter (manufactured by DKK-TOA CORPORATION) was used.

Electrical conductivity: a conductivity meter (manufactured by DKK-TOA CORPORATION)) was used.

Viscosity: a B-type viscometer (manufactured by TOKYO KEIKI INC.) was used.

Surface tension: Surface Tensiometer DY-500 (manufactured by Kyowa Interface Science Co., Ltd) was used.

High Temperature and Salt Resistance Evaluation-1

After a stir bar was put into a 200-ml styrene container, 50 g of each chemical fluid produced in Example or Comparative Example was charged. With stirring with a magnetic stirrer, 100 g of a brine solution with a salt concentration of 6% by mass (sodium chloride concentration of 4.8% by mass, calcium chloride concentration of 1.2% by mass) was charged and stirred for 1 hour. This solution was set as a brine test sample (a) for evaluating the heat resistance and the salt resistance of the chemical fluid under a salt concentration of 4% by mass.

In a 120-ml Teflon (registered trademark) sealable container, 65 g of the brine test sample (a) was put and sealed. After that, the Teflon container was placed in a drier at 100° C. and held at 100° C. for a predetermined time, and then the appearance of the brine test sample (a), pH, electrical conductivity, viscosity, DLS average particle diameter of aqueous silica sol (silica particles) in the sample were evaluated.

The high temperature and salt resistance was determined as follows, based on the measurement result of DLS average particle diameter of the aqueous silica sol (silica particles) in the sample and the evaluation of the appearance, after holding at high temperature for a predetermined time.

Determination of High Temperature and Salt Resistance

A: Ratio of DLS average particle diameter after high temperature and salt resistance test/DLS average particle diameter of chemical fluid is 1.1 or less; silica sol is not degraded; resistance to high temperature and salt is extremely high.

B: Ratio of DLS average particle diameter after high temperature and salt resistance test/DLS average particle diameter of chemical fluid is 1.2 to 1.5; resistance to high temperature and salt is high.

C: Ratio of DLS average particle diameter after high temperature and salt resistance test/DLS average particle diameter of chemical fluid is 1.6 to 8.0; resistance to high temperature and salt is normal.

D: Ratio of DLS average particle diameter after high temperature and salt resistance test/DLS average particle diameter of chemical fluid is 8.1 to 20.0; resistance to high temperature and salt is poor.

E: Ratio of DLS average particle diameter after high temperature and salt resistance test/DLS average particle diameter of chemical fluid is 20.1 or more; DLS average particle diameter could not be measured because silica sol gelled; white precipitate is produced;

resistance to high temperature and salt is extremely poor.

High Temperature and Salt Resistance Evaluation-2

After a stir bar was put into a 200-ml styrene container, 50 g of each chemical fluid produced in Example or Comparative Example was charged. With stirring with a magnetic stirrer, 100 g of a brine solution with a salt concentration of 15% by mass (sodium chloride concentration of 12.0% by mass, calcium chloride concentration of 3.0% by mass) was charged and stirred for 1 hour. This solution was set as a brine test sample (b) for evaluating the heat resistance and the salt resistance of the chemical fluid under a salt concentration of 10% by mass consisting of 8% by mass of sodium chloride and 2% by mass of calcium chloride which is determined by API Standard (standard on petroleum determined by American Petroleum Institute).

The resistance to high temperature and salt was determined through the same operation as in High Temperature and Salt Resistance Evaluation-1 above.

High Temperature and Salt Resistance Evaluation-3

After 2408 g of pure water was put into a 3-L polyethylene container, 92 g of artificial seawater powder (trade name: MARINE ART SF-1 manufactured by Tomita Pharmaceutical Co., Ltd.) was charged to prepare artificial seawater. After a stir bar was put into a 200-ml styrene container, each chemical fluid produced in Examples, pure water and the artificial seawater were charged with stirring with a magnetic stirrer to prepare 150 g of a mixed fluid having a silica concentration of 1.0% by mass, and the mixed fluid was stirred for 1 hour. This fluid was set as a seawater test sample for evaluating the heat resistance and the salt resistance of the chemical fluid in artificial seawater.

The resistance to high temperature and salt was determined through the same operation as in (High Temperature and Salt Resistance Evaluation-1) above.

High Temperature and Salt Resistance Evaluation-4

After 2408 g of pure water was put into a 3-L polyethylene container, 92 g of artificial seawater powder (trade name: MARINE ART SF-1 manufactured by Tomita Pharmaceutical Co., Ltd.) was charged to prepare artificial seawater. After a stir bar was put into a 200-ml styrene container, each chemical fluid produced in Examples, pure water and the artificial seawater were charged with stirring with a magnetic stirrer to prepare 150 g of a mixed fluid having a silica concentration of 0.5% by mass, and the mixed fluid was stirred for 1 hour. This fluid was set as a seawater test sample for evaluating the heat resistance and the salt resistance of the chemical fluid in artificial seawater.

The resistance to high temperature and salt was determined through the same operation as in (High Temperature and Salt Resistance Evaluation-1) above.

Preparation of Crude Oil Recovery Chemical Fluid: Preparation of Aqueous Sol

Synthesis Example 1

In a 500-ml glass eggplant flask, 200 g of an aqueous silica sol (SNOWTEX (registered trademark) ST-O manufactured by Nissan Chemical Corporation, silica concentration=20.5% by mass, the average particle diameter of 11.0 nm according to the BET method, DLS average particle diameter of 17.2 nm) and a magnetic stir bar were put. After that, with stirring with a magnetic stirrer, 4.0 g of 3-glycidoxypropyltrimethoxysilane (Dynasylan GLYMO manufactured by Evonik Industries AG) was charged such that the mass ratio of the silane compound to silica in the aqueous silica sol was 0.09. Subsequently, a cooling tube through which tap water flowed was installed above the eggplant flask. Under reflux, the temperature of the aqueous sol was increased to 60° C. and held at 60° C. for 3 hours, and thereafter cooled. After cooling to room temperature, the aqueous sol was taken out.

We obtained 204 g of an aqueous sol including an aqueous silica sol surface-treated with a silane compound in which the mass ratio of the silane compound was 0.09 with respect to silica in the aqueous silica sol, the silica solid content=20.2% by mass, pH=3.1, electrical conductivity=452 µS/cm, and DLS average particle diameter=24.3 nm.

Synthesis Example 2

An aqueous sol was obtained through the same operation as in Synthesis Example 1 except that 7.9 g of 3-glycidoxypropyltrimethoxysilane (Dynasylan GLYMO manufactured by Evonik Industries AG) was charged such that the mass ratio of the silane compound was 0.20 with respect to silica in the aqueous silica sol (SNOWTEX® ST-O manufactured by Nissan Chemical Corporation, silica concentration=20.5% by mass, average particle diameter of 11.0 nm according to the BET method, DLS average particle diameter of 17.2 nm).

We obtained 208 g of an aqueous sol including an aqueous silica sol surface-treated with a silane compound in which the mass ratio of the silane compound was 0.2 with respect to silica in the aqueous silica sol, silica solid content=20.6% by mass, pH=2.9, electrical conductivity=544 µS/cm, and DLS average particle diameter=19.5 nm.

Synthesis Example 3

An aqueous sol was obtained through the same operation as in Synthesis Example 1 except that 15.8 g of 3-glycidoxypropyltrimethoxysilane (Dynasylan GLYMO manufactured by Evonik Industries AG) was charged such that the mass ratio of the silane compound was 0.40 with respect to silica in the aqueous silica sol (SNOWTEX® ST-O manufactured by Nissan Chemical Corporation, silica concentration=20.5% by mass, average particle diameter of 11.0 nm according to the BET method, DLS average particle diameter of 17.2 nm).

We obtained 216 g of an aqueous sol including an aqueous silica sol surface-treated with a silane compound in which the mass ratio of the silane compound was 0.4 with respect to silica in the aqueous silica sol, silica solid content=20.5% by mass, pH=2.9, electrical conductivity=474 µS/cm, and DLS average particle diameter=19.7 nm.

Synthesis Example 4

An aqueous sol was obtained through the same operation as in Synthesis Example 1 except that 31.6 g of 3-glycidoxypropyltrimethoxysilane (Dynasylan GLYMO manufactured by Evonik Industries AG) was charged such that the mass ratio of the silane compound was 0.80 with respect to silica in the aqueous silica sol (SNOWTEX® ST-O manufactured by Nissan Chemical Corporation, silica concentration=20.5% by mass, average particle diameter of 11.0 nm according to the BET method, DLS average particle diameter of 17.2 nm).

We obtained 231 g of an aqueous silica sol surface-treated with a silane compound in which the mass ratio of the silane compound was 0.8 with respect to silica in the aqueous silica sol, silica solid content=20.6% by mass, pH=2.8, electrical conductivity=413 µS/cm, and DLS average particle diameter=20.8 nm.

Synthesis Example 5

In a 500-ml glass eggplant flask, 250 g of an aqueous silica sol (SNOWTEX® ST-OXS manufactured by Nissan Chemical Corporation, silica concentration=10.4% by mass, the average particle diameter of 5.0 nm according to Sears method, DLS average particle diameter of 8.1 nm) and a magnetic stir bar were put. After that, with stirring with a magnetic stirrer, 88.9 g of 3-glycidoxypropyltrimethoxysilane (Dynasylan GLYMO manufactured by Evonik Industries AG) was charged such that the mass ratio of the silane compound to silica in the aqueous silica sol was 3.4. Subsequently, a cooling tube through which tap water flowed was installed above the eggplant flask. Under reflux, the temperature of the aqueous sol was increased to 60° C. and held at 60° C. for 3 hours, and thereafter cooled. After cooling to room temperature, the aqueous sol was taken out.

We obtained 338 g of an aqueous sol including an aqueous silica sol surface-treated with a silane compound in which the mass ratio of the silane compound was 3.4 with respect to silica in the aqueous silica sol, the silica solid content=14.3% by mass, pH=2.9, electrical conductivity=163 µS/cm, and DLS average particle diameter=8.1 nm.

Synthesis Example 6

An aqueous sol was obtained through the same operation as in Synthesis Example 1 except that in a 500-ml glass eggplant flask, 200 g of an aqueous silica sol (SNOWTEX® ST-OL manufactured by Nissan Chemical Corporation, silica concentration=20.0% by mass, the average particle diameter of 46 nm according to the BET method, DLS average particle diameter of 75.8 nm) and a magnetic stir bar were put, and then, with stirring with a magnetic stirrer, 31.9 g of 3-glycidoxypropyltrimethoxysilane (Dynasylan GLYMO manufactured by Evonik Industries AG) was charged such that the mass ratio of the silane compound was 1.6 with respect to silica in the aqueous silica sol.

We obtained 231 g of an aqueous silica sol surface-treated with a silane compound in which the mass ratio of the silane compound was 0.8 with respect to silica in the aqueous silica sol, silica solid content=21.2% by mass, pH=3.1, electrical conductivity=160 µS/cm, and DLS average particle diameter=76.4 nm.

Synthesis Example 7

An aqueous sol was obtained through the same operation as in Synthesis Example 1 except that in a 500-ml glass eggplant flask, 115 g of an aqueous silica sol (SNOWTEX® ST-OZL-35 manufactured by Nissan Chemical Corporation, silica concentration=35.7% by mass, the average particle diameter of 83 nm according to the BET method, DLS average particle diameter of 126 nm), 85 g of pure water and a magnetic stir bar were put, and then, with stirring with a magnetic stirrer, 32.8 g of 3-glycidoxypropyltrimethoxysilane (Dynasylan GLYMO manufactured by Evonik Industries AG) was charged such that the mass ratio of the silane compound was 0.8 with respect to silica in the aqueous silica sol.

We obtained 232 g of an aqueous silica sol surface-treated with a silane compound in which the mass ratio of the silane compound was 1.6 with respect to silica in the aqueous silica sol, silica solid content=20.7% by mass, pH=2.6, electrical conductivity=579 μS/cm, and DLS average particle diameter=119 nm.

Preparation of Crude Oil Recovery Chemical Fluid

Example 1

In a 300-ml styrene container, a stir bar was put, and 91.0 g of pure water was charged. With stirring with a magnetic stirrer, 2.3 g of an anionic surfactant sodium α-olefin sulfonate (NEOGEN® AO-90 manufactured by DKS Co. Ltd.) was charged and stirred until it was completely melted. Subsequently, 4.7 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 2 was charged. Subsequently, 30.0 g of polyoxyethylene nonylphenyl ether (reagent Tergitol® NP-9 manufactured by Sigma-Aldrich Corporation) with HLB=13.0 was charged as a nonionic surfactant and then stirred for 1 hour to produce a chemical fluid of Example 1.

A brine test sample (a) was prepared according to the high temperature and salt resistance evaluation-1 and held at 100° C. for 30 hours. After that, the sample was taken out to evaluate the resistance to high temperature and salt.

Example 2

A chemical fluid of Example 2 was produced through the same operation as in Example 1 except that the amount of pure water charged was 106.0 g and the amount of polyoxyethylene nonylphenyl ether (regent Tergitol® NP-9 manufactured by Sigma-Aldrich Corporation) with HLB=13.0 charged as a nonionic surfactant was 15.0 g.

A brine test sample (a) was prepared according to the high temperature and salt resistance evaluation-1 and held at 100° C. for 30 hours. After that, the sample was taken out to evaluate the resistance to high temperature and salt.

Example 3

A chemical fluid of Example 3 was produced through the same operation as in Example 1 except that the amount of pure water charged was 113.5 g and the amount of polyoxyethylene nonylphenyl ether with HLB=13.0 (reagent Tergitol® NP-9 manufactured by Sigma-Aldrich Corporation) charged as a nonionic surfactant was 7.5 g.

A brine test sample (a) was prepared according to the high temperature and salt resistance evaluation-1 and held at 100° C. for 30 hours. After that, the sample was taken out to evaluate the resistance to high temperature and salt.

Example 4

A chemical fluid of Example 4 was produced through the same operation as in Example 2 except that polyoxyethylene styrenated phenyl ether (NOIGEN® EA-137 manufactured by DKS Co. Ltd.) with HLB=13.0 was employed as a nonionic surfactant and charged in an amount of 15.0 g.

A brine test sample (a) was prepared according to the high temperature and salt resistance evaluation-1 and held at 100° C. for 30 hours. After that, the sample was taken out to evaluate the resistance to high temperature and salt.

Example 5

A chemical fluid of Example 5 was produced through the same operation as in Example 2 except that the amount of pure water charged was 99.6 g, and 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant.

A brine test sample (a) was prepared according to the high temperature and salt resistance evaluation-1 and held at 100° C. for 30 hours. After that, the sample was taken out to evaluate the resistance to high temperature and salt.

Example 6

In a 300-ml styrene container, a stir bar was put, and 99.5 g of pure water was charged. With stirring with a magnetic stirrer, 1.8 g of an anionic surfactant sodium α-olefin sulfonate (NEOGEN® AO-90 manufactured by DKS Co. Ltd.) was charged and stirred until it was completely melted. Subsequently, 5.3 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 2 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Example 6.

A brine test sample (a) was prepared according to the high temperature and salt resistance evaluation-1 and held at 100° C. for 60 hours. After that, the sample was taken out to evaluate the resistance to high temperature and salt.

Example 7

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Example 7.

A brine test sample (a) was prepared according to the high temperature and salt resistance evaluation-1 and held at 100° C. for 60 hours. After that, the sample was taken out to evaluate the resistance to high temperature and salt.

Example 8

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Example 8.

A brine test sample (b) was prepared according to the high temperature and salt resistance evaluation-2 and held at 100° C. for 60 hours. After that, the sample was taken out to evaluate the resistance to high temperature and salt.

Example 9

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol surface-treated with the silane compound produced in Synthesis Example 4 was charged. Subsequently, 21.4 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 9.

A seawater test sample was prepared according to the high temperature and salt resistance evaluation-3 and held at 100° C. for 60 hours. After that, the sample was taken out to evaluate the resistance to high temperature and salt.

Example 10

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol surface-treated with the silane compound produced in Synthesis Example 3 was charged. Subsequently, 15.2 g of polyoxyethylene tridecyl ether (NOIGEN® TDS-90 manufactured by DKS Co. Ltd.) with HLB=13.6 was charged as a nonionic surfactant and then stirred for 1 hour to produce a chemical fluid of Example 10.

A brine test sample (a) was prepared according to the high temperature and salt resistance evaluation-1 and held at 100° C. for 30 hours. After that, the sample was taken out to evaluate the resistance to high temperature and salt.

Example 11

In a 300-ml styrene container, a stir bar was put, and 99.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol surface-treated with the silane compound produced in Synthesis Example 4 was charged. Subsequently, 21.4 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 11

A brine test sample (b) was prepared according to the high temperature and salt resistance evaluation-2 and held at 100° C. for 60 hours. After that, the sample was taken out to evaluate the resistance to high temperature and salt.

Example 12

In a 300-ml styrene container, a stir bar was put, and 48.8 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 72.8 g of the aqueous silica sol surface-treated with the silane compound produced in Synthesis Example 4 was charged. Subsequently, 21.4 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 12

A seawater test sample was prepared according to the high temperature and salt resistance evaluation-3 and held at 100° C. for 60 hours. After that, the sample was taken out to evaluate the resistance to high temperature and salt.

Example 13

In a 300-ml styrene container, a stir bar was put and 6.4 g of pure water and 131.1 g of the aqueous silica sol surface-treated with the silane compound produced in Synthesis Example 4 were charged and stirred with a magnetic stirrer. With stirring with a magnetic stirrer, 3.5 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 1.3 g of an anionic surfactant sodium dodecyl sulfate (Shinorine® 90TK-T manufactured by New Japan Chemical CO., Ltd.) was charged and stirred until it was completely melted. Then, 7.7 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 13.

A seawater test sample was prepared according to the high temperature and salt resistance evaluation-3 and held at 100° C. for 60 hours. After that, the sample was taken out to evaluate the resistance to high temperature and salt.

Example 14

In a 300-ml styrene container, a stir bar was put and 14.7 g of pure water and 131.1 g of the aqueous silica sol surface-treated with the silane compound produced in Synthesis Example 4 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 2.6 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 14.

A seawater test sample was prepared according to the high temperature and salt resistance evaluation-3 and held at 100° C. for 60 hours. After that, the sample was taken out to evaluate the resistance to high temperature and salt.

Example 15

In a 300-ml styrene container, a stir bar was put and 15.5 g of pure water and 131.1 g of the aqueous silica sol surface-treated with the silane compound produced in Synthesis Example 4 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 1.8 g of polyoxyethylene styrenated phenyl ether (manufactured by DKS Co. Ltd. NOIGEN® EA-127) with HLB=11.7 was charged as a nonionic surfactant and then stirred for 1 hour to produce a chemical fluid of Example 15.

A seawater test sample was prepared according to the high temperature and salt resistance evaluation-3 and held at 100° C. for 60 hours. After that, the sample was taken out to evaluate the resistance to high temperature and salt.

Example 16

In a 300-ml styrene container, a stir bar was put and 14.0 g of pure water and 131.1 g of the aqueous silica sol surface-treated with the silane compound produced in Synthesis Example 4 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 3.3 g of polyoxyethylene styrenated phenyl ether (manufactured by DKS Co. Ltd. NOIGEN® EA-207D, active ingredients: 55%) with HLB=18.7 was charged as a nonionic surfactant and then stirred for 1 hour to produce a chemical fluid of Example 16.

A seawater test sample was prepared according to the high temperature and salt resistance evaluation-3 and held at 100° C. for 60 hours. After that, the sample was taken out to evaluate the resistance to high temperature and salt.

Example 17

In a 300-ml styrene container, a stir bar was put, and 90.1 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted.

Subsequently, 31.5 g of the aqueous silica sol produced in Synthesis Example 5 was charged. Subsequently, 21.4 g of polyoxyethylene styrenated phenyl ether (manufactured by DKS Co. Ltd. NOIGEN® EA-157) with HLB=14.3 was charged as a nonionic surfactant and then stirred for 1 hour to produce a chemical fluid of Example 17.

A brine test sample (a) was prepared according to the high temperature and salt resistance evaluation-1 and held at 100° C. for 60 hours. After that, the sample was taken out to evaluate the resistance to high temperature and salt.

Example 18

In a 300-ml styrene container, a stir bar was put and 18.4 g of pure water and 127.4 g of the aqueous silica sol surface-treated with the silane compound produced in Synthesis Example 6 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.45 g of an anionic surfactant sodium dodecyl sulfate (Shinorine® 90TK-T manufactured by New Japan Chemical CO., Ltd.) was charged and stirred until it was completely melted. Then, 2.6 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 18.

A seawater test sample was prepared according to the high temperature and salt resistance evaluation-3 and held at 100° C. for 30 hours. After that, the sample was taken out to evaluate the resistance to high temperature and salt.

Example 19

In a 300-ml styrene container, a stir bar was put and 15.3 g of pure water and 130.5 g of the aqueous silica sol surface-treated with the silane compound produced in Synthesis Example 7 were charged and stirred with a magnetic stirrer. With stirring with a magnetic stirrer, 1.2 g of an anionic surfactant sodium α-olefin sulfonate (LIPOLAN® LB-440 manufactured by Lion Specialty Chemicals Co. Ltd., active ingredients: 36.3%) was charged and stirred. Subsequently, 0.4 g of an anionic surfactant sodium dodecyl sulfate (Shinorine® 90TK-T manufactured by New Japan Chemical CO., Ltd.) was charged and stirred until it was completely melted. Then, 2.6 g of a product of polyoxyethylene styrenated phenyl ether (manufactured by DKS Co. Ltd. NOIGEN® EA-157) with HLB=14.3 diluted with pure water to contain 70% of active ingredients was charged as a nonionic surfactant and then stirred for 1 hour to produce a chemical fluid of Example 19.

A seawater test sample was prepared according to the high temperature and salt resistance evaluation-3 and held at 100° C. for 30 hours. After that, the sample was taken out to evaluate the resistance to high temperature and salt.

Example 20

A chemical fluid of Example 20 was produced through the similar operation as in Example 13.

A seawater test sample was prepared according to the high temperature and salt resistance evaluation-4 and held at 100° C. for 75 days (1800 hours). After that, the sample was taken out to evaluate the resistance to high temperature and salt.

Example 21

A chemical fluid of Example 21 was produced through the similar operation as in Example 14.

A seawater test sample was prepared according to the high temperature and salt resistance evaluation-4 and held at 100° C. for 75 days (1800 hours). After that, the sample was taken out to evaluate the resistance to high temperature and salt.

Reference Example 1

A chemical fluid of Reference Example 1 (comprising no silane compound) was produced through the same operation as in Example 1 except that 22.0 g of an aqueous silica sol (SNOWTEX® ST-O manufactured by Nissan Chemical Corporation) was charged instead of the aqueous silica sol produced in Synthesis Example 2.

A brine test sample (a) was prepared according to the high temperature and salt resistance evaluation-1 and held at room temperature for 7 days. After that, the sample was taken out to evaluate the salt resistance.

Reference Example 2

A chemical fluid of Reference Example 2 (mass ratio of silane compound to silica:0.09) was produced through the same operation as in Example 1 except that 22.0 g of the aqueous silica sol produced in Synthesis Example 1 was charged instead of the aqueous silica sol produced in Synthesis Example 2.

A brine test sample (a) was prepared according to the high temperature and salt resistance evaluation-1 and held at room temperature for 7 days. After that, the sample was taken out to evaluate the salt resistance.

Reference Example 3

A chemical fluid of Reference Example 3 (comprising no nonionic surfactant) was produced through the same operation as in Example 1 except that the amount of polyoxyethylene nonylphenyl ether (reagent Tergitol® NP-9 manufactured by Sigma-Aldrich Corporation) with HLB=13.0 charged as a nonionic surfactant was 0 g.

A brine test sample (a) was prepared according to the high temperature and salt resistance evaluation-1, but it became cloudy immediately after preparation, and white gel was precipitated.

Reference Example 4

A chemical fluid of Reference Example 4 (comprising nonionic surfactant having a low HLB value) was produced through the same operation as in Example 4 except that the amount of polyoxyethylene styrenated phenyl ether (manufactured by DKS Co. Ltd. NOIGEN® EA-017) with HLB=2.7 charged as a nonionic surfactant was 15.0 g.

The chemical fluid prepared as above caused complete two-phase separation of an aqueous phase composed of the aqueous silica sol and the water-soluble anionic surfactant and an oil phase composed of the nonionic surfactant. Therefore, the evaluation of resistance to high temperature and salt could not be carried out.

Comparative Example 1

In a 300-ml styrene container, a stir bar was put, and 99.6 g of pure water was charged. With stirring with a magnetic stirrer, 6.8 g of an anionic surfactant sodium α-olefin sulfonate (NEOGEN® AO-90 manufactured by DKS Co. Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Comparative Example 1 (comprising only one anionic surfactant).

A brine test sample (b) was prepared according to the high temperature and salt resistance evaluation-2 and held at 100° C. for 60 hours. After that, the sample was taken out to evaluate the resistance to high temperature and salt.

Comparative Example 2

In a 300-ml styrene container, a stir bar was put, and 99.6 g of pure water was charged. With stirring with a magnetic stirrer, 6.8 g of an anionic surfactant sodium dodecyl sulfate (Shinorine® 90TK-T manufactured by New Japan Chemical CO., Ltd.) was charged and stirred until it was completely melted.

Subsequently, 22.0 g of the aqueous silica sol produced in Synthesis Example 3 was charged. Subsequently, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Comparative Example 2 (comprising only one anionic surfactant).

A brine test sample (b) was prepared according to the high temperature and salt resistance evaluation-2 and held at 100° C. for 60 hours. After that, the sample was taken out to evaluate the resistance to high temperature and salt.

Comparative Example 3

In a 300-ml styrene container, a stir bar was put, and 128.0 g of pure water was charged. With stirring with a magnetic stirrer, 22.0 g of the aqueous silica sol produced in Synthesis Example 4 was charged and stirred until it to produce a chemical fluid of Comparative Example 3 (comprising only silane/silica and comprising no surfactant).

A brine test sample (b) was prepared according to the high temperature and salt resistance evaluation-2 and held at 100° C. for 60 hours. After that, the sample was taken out to evaluate the resistance to high temperature and salt.

Comparative Example 4

In a 300-ml styrene container, a stir bar was put, and 121.6 g of pure water was charged. With stirring with a magnetic stirrer, 3.5 g of an anionic surfactant sodium α-olefin sulfonate (NEOGEN® AO-90 manufactured by DKS Co. Ltd.) was charged and stirred until it was completely melted. Subsequently, 3.5 g of an anionic surfactant sodium dodecyl sulfate (Shinorine® 90TK-T manufactured by New Japan Chemical CO., Ltd.) was charged and stirred until it was completely melted. Then, 21.4 g of a product of polyoxyethylene styrenated phenyl ether (NOIGEN® EA-157 manufactured by DKS Co. Ltd.) with HLB=14.3 diluted with pure water to contain 70% of active ingredients was charged as a nonionic surfactant and then stirred for 1 hour to produce a chemical fluid of Comparative Example 4 (comprising only surfactant and comprising no silica/silane).

A brine test sample (b) was prepared according to the high temperature and salt resistance evaluation-2 and held at 100° C. for 60 hours. After that, the sample was taken out to evaluate the resistance to high temperature and salt.

The results of high temperature and salt resistance tests of Examples are shown in Table 1 and the results of high temperature and salt resistance tests of Comparative Examples are shown in Table 2.

The kinds (reference signs) of anionic surfactants and nonionic surfactants in the tables are denoted as follows.

Anionic Surfactants
AOS: sodium α-olefin sulfonate "NEOGEN® AO-90", active ingredients: 98.0%, DKS Co. Ltd.
AOS: sodium α-olefin sulfonate "LIPOLAN® LB-440", active ingredients: 36.3%, Lion Specialty Chemicals Co. Ltd.
SDS: sodium dodecyl sulfate "Shinorine® 90TK-T", active ingredients: 96.0%, New Japan Chemical CO., Ltd.
Nonionic Surfactants
NP-9: polyoxyethylene nonylphenyl ether "Tergitol® NP-9", active ingredients: 100%, Sigma-Aldrich Corporation
EA-017: polyoxyethylene styrenated phenyl ether "NOIGEN® EA-017", active ingredients: 100%, DKS Co. Ltd.
EA-127: polyoxyethylene styrenated phenyl ether "NOIGEN® EA-127", active ingredients: 100%, DKS Co. Ltd.
EA-137: polyoxyethylene styrenated phenyl ether "NOIGEN® EA-137", active ingredients: 100%, DKS Co. Ltd.
EA-157: polyoxyethylene styrenated phenyl ether "NOIGEN® EA-157", active ingredients: 100%, DKS Co. Ltd.
EA-207D: polyoxyethylene styrenated phenyl ether "NOIGEN® EA-207D", active ingredients: 55%, DKS Co. Ltd.
TDS-90: polyoxyethylene tridecyl ether "NOIGEN® TDS-90", active ingredients: 100%, DKS Co. Ltd.

Crude Oil Recoverability Evaluation-1

By using the crude recovery chemical fluids of Example 8, Reference Example 1, Comparative Example 3 and Comparative Example 4, and a crude oil substitute (n-decane) and Berea sandstones, the crude oil recoverability evaluation which assumed underground oil reservoirs was made.

In the meantime, the crude recovery chemical fluids of Example 8, Reference Example 1 and Comparative Example 3 were adjusted to have silica concentration of 1.0% by mass with 3% by mass sodium chloride aqueous solution to prepare a sample for crude oil recoverability evaluation. In addition, the crude recovery chemical fluid of Comparative Example 4 was prepared as a sample for crude oil recoverability evaluation by mixing 100 g of the chemical fluid and 200 g of 3% by mass sodium chloride aqueous solution.

As the crude oil substitute, an oil obtained by dyeing n-decane (manufactured by Nacalai Tesque, Inc.) with a red oil pigment (oil scarlet manufactured by Aikuma Senryo Co., Ltd.) was used.

As Berea sandstones, a sample which has a permeability of about 150 mD, a pore amount of about 5 ml, a length of 1.5 inch and a diameter of 1 inch and which was obtained by drying at 60° C. for one day was used.

In vacuum container, a sample of Berea sandstones was immersed in a saltwater of 3% by mass sodium chloride aqueous solution, and saturated with the saltwater by evacuating the container with a vacuum pump, and then the sample of Berea sandstones was taken out, and the saturation amount of saltwater was measured in accordance with gravimetric method.

The sample of Berea sandstones saturated with the saltwater was set to a core-holder of a flooding method oil recovery apparatus SRP-350 (manufactured by Vinc Tecknologies SA). After increasing the temperature of the core-holder to 60° C., the crude oil substitute (n-decane colored in red) was pressed into the sample of Berea sandstones with application of a lateral pressure of 2000 psi, and then the sample of Berea sandstones was taken out from the core-holder, and the saturation amount of oil was measured in accordance with gravimetric method.

The sample of Berea sandstones saturated with oil was set again to a core-holder of a flooding method oil recovery apparatus SRP-350, and then a saltwater of 3% by mass sodium chloride aqueous solution was pressed at a flow rate of 2 ml/min. into the sample of Berea sandstones, and the oil recovery ratio flooded with saltwater was measured from the volume of the discharged n-decane.

Then, the sample for crude oil recoverability evaluation of Examples or Comparative Examples which was prepared as mentioned above was pressed at a flow rate of 2 ml/min. into the sample of Berea sandstones, and the oil recovery ratio flooded with chemical fluid was measured from the volume of the discharged n-decane.

Crude Oil Recoverability Evaluation-2

By using the crude recovery chemical fluids of Example 13, Example 14, Example 15, Example 16 and Comparative Example 3, and a crude oil substitute (paraffin oil) and Berea sandstones, the crude oil recoverability evaluation which assumed subsea oil reservoirs was made.

In the meantime, the crude recovery chemical fluids of Example 13, Example 14, Example 15, Example 16 and Comparative Example 3 were adjusted to have silica concentration of 1.0% by mass with the artificial seawater prepared in (High Temperature and Salt Resistance Evaluation-3) to prepare a sample for crude oil recoverability evaluation.

As the crude oil substitute, an oil obtained by dyeing paraffin oil obtained by purifying crude oil (ONDINA OIL manufactured by Showa Shell Sekiyu K.K.) with a red oil pigment (oil scarlet manufactured by Aikuma Senryo Co., Ltd.) was used.

As Berea sandstones, a sample which has a permeability of about 150 mD, a pore amount of about 5 ml, a length of 1.5 inch and a diameter of 1 inch and which was obtained by drying at 60° C. for one day was used.

In vacuum container, a sample of Berea sandstones was immersed in as saltwater, the artificial seawater prepared in (High Temperature and Salt Resistance Evaluation-3), and saturated with the saltwater by evacuating the container with a vacuum pump, and then the sample of Berea sandstones was taken out, and the saturation amount of saltwater was measured in accordance with gravimetric method.

The sample of Berea sandstones saturated with the saltwater (artificial seawater) was set to a core-holder of a flooding method oil recovery apparatus SRP-350 (manufactured by Vinc Tecknologies SA). After increasing the temperature of the core-holder to 60° C., the crude oil substitute (paraffin oil colored in red) was pressed into the sample of Berea sandstones with application of a lateral pressure of 2000 psi, and then the sample of Berea sandstones was taken out, and the saturation amount of oil was measured in accordance with gravimetric method.

The sample of Berea sandstones saturated with the oil was set again to a core-holder of a flooding method oil recovery apparatus SRP-350, and then the artificial seawater prepared in (High Temperature and Salt Resistance Evaluation-3) was pressed at a flow rate of 2 ml/min. into the sample of Berea sandstones, and the oil recovery ratio flooded with saltwater was measured from the volume of the discharged paraffin oil.

Then, the sample for crude oil recoverability evaluation of Examples or Comparative Examples which was prepared as mentioned above was pressed at a flow rate of 2 ml/min. into the sample of Berea sandstones, and the oil recovery ratio flooded with chemical fluid was measured from the volume of the discharged paraffin oil.

The results of oil recovery ratio of Examples and Comparative Examples are shown in Table 3.

Measurement of Surface Tension

The crude oil recovery chemical fluid of the present invention is a chemical fluid which is suitable for surfactant-flooding among EOR techniques. As the crude oil recovery chemical fluid of the present invention includes surfactants, it lowers water-oil interfacial tension in oil reservoirs, and improves replacement effect of oil with water, and thus can be expected to have enhanced recovery effect of crude oil.

When crude oil is subjected to enhanced recovery, a diluted chemical fluid is generally pressed into underground or subsea oil reservoirs. For the dilution, inexpensive seawater is often used.

Then, the surface tension of each of the high temperature and salt resistance evaluation samples (brine test samples (a)) prepared in Example 5, Example 6, Example 7, Example 11, Example 13, and Example 14 was measured under condition close to the actual use.

As a comparative example, the surface tension of pure water, Comparative Example 3 prepared in (High Temperature and Salt Resistance Evaluation-3), an artificial seawater, and saltwater with a salt concentration of 4% by mass (saltwater with a sodium chloride concentration of 3.2% by mass and a calcium chloride concentration of 0.8% by mass) was measured.

The measurement results of surface tension are shown in Table 4.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Aqueous silica sol | | Synthesis Example 2 | Synthesis Example 2 | Synthesis Example 2 | Synthesis Example 2 | Synthesis Example 2 | Synthesis Example 2 | Synthesis Example 3 | Synthesis Example 3 | Synthesis Example 4 | Synthesis Example 3 |
| Amount of silane treated Silane/SiO$_2$ | Ratio by mass | 0.2 | 0.2 | 0.2 | 0.2 | 0.2 | 0.2 | 0.4 | 0.4 | 0.8 | 0.4 |
| Silica concentration | % by mass | 3.0 | 3.0 | 3.0 | 3.0 | 3.0 | 3.0 | 3.0 | 3.0 | 3.0 | 3.0 |
| Anionic surfactant (AOS) concentration | % by mass | 1.5 | 1.5 | 1.5 | 1.5 | 1.5 | 1.2 | 2.3 | 2.3 | 2.3 | 2.3 |
| Anionic surfactant (SDS) concentration | % by mass | 3.0 | 3.0 | 3.0 | 3.0 | 3.0 | 3.4 | 2.2 | 2.2 | 2.2 | 2.2 |
| Nonionic surfactant concentration | % by mass | 20 | 10 | 5 | 10 | 10 | 10 | 10 | 10 | 10 | 10 |
| Anionic surfactant (AOS) kind | | AO-90 | AO-90 | AO-90 | AO-90 | AO-90 | AO-90 | AO-90 | AO-90 | AO-90 | AO-90 |
| AOS/SDS molar ratio | | 0.5 | 0.5 | 0.5 | 0.5 | 0.5 | 0.33 | 1.0 | 1.0 | 1.0 | 1.0 |
| Anionic surfactant/Silica mass ratio | | 1.52 | 1.52 | 1.52 | 1.52 | 1.52 | 1.59 | 1.54 | 1.54 | 1.54 | 1.54 |
| Nonionic surfactant kind | | NP-9 | NP-9 | NP-9 | EA-137 | EA-157 | EA-157 | EA-157 | EA-157 | EA-157 | TDS-90 |
| Nonionic surfactant HLB | | 13.0 | 13.0 | 13.0 | 13.0 | 14.3 | 14.3 | 14.3 | 14.3 | 14.3 | 13.6 |
| Physical properties of chemical fluid | | | | | | | | | | | |
| pH | | 8.3 | 8.3 | 8.3 | 8.4 | 8.3 | 8.2 | 9.2 | 9.2 | 9.1 | 8.8 |
| Electrical conductivity | mS/cm | 4.62 | 5.28 | 5.68 | 5.23 | 4.92 | 5.65 | 5.5 | 5.5 | 5.28 | 5.62 |
| Viscosity | mPa·s | 51 | 14 | 8 | 10 | 12 | 8 | 13 | 13 | 13 | 12 |
| DLS average particle diameter | nm | 20.1 | 21.6 | 22.9 | 21.0 | 22.2 | 26.1 | 23.7 | 23.7 | 23.1 | 24.0 |
| Physical properties of high temperature and salt resistance evaluation sample | | | | | | | | | | | |
| Salt concentration | % by mass | 4 | 4 | 4 | 4 | 4 | 4 | 4 | 10 | Artificial seawater | 4 |
| Silica concentration | % by mass | 1 | 1 | 1 | 1 | 1 | 1 | 1 | 1 | 1 | 1 |
| pH | | 7.4 | 7.5 | 7.5 | 7.5 | 7.5 | 7.2 | 8.1 | 7.8 | 8.4 | 7.9 |
| Electrical conductivity | mS/cm | 54.5 | 55.9 | 57.0 | 54.8 | 55.3 | 52 | 51.8 | 102 | 29.7 | 50.8 |
| Viscosity | mPa·s | 93 | 64 | 42 | 6 | 8 | 9 | 9 | 10 | 10 | 9 |
| DLS average particle diameter | nm | 20.1 | 21.6 | 22.2 | 18.5 | 18.5 | 17.5 | 17.0 | 17.4 | 17.3 | 17.7 |
| Evaluation of resistance to high temperature and salt | Evaluation procedure | Resistance to high temperature and salt evaluation-1 | Resistance to high temperature and salt evaluation-1 | Resistance to high temperature and salt evaluation-1 | Resistance to high temperature and salt evaluation-1 | Resistance to high temperature and salt evaluation-1 | Resistance to high temperature and salt evaluation-1 | Resistance to high temperature and salt evaluation-1 | Resistance to high temperature and salt evaluation-2 | Resistance to high temperature and salt evaluation-3 | Resistance to high temperature and salt evaluation-1 |
| Test condition | | 100° C. × 30 hr | 100° C. × 30 hr | 100° C. × 30 hr | 100° C. × 30 hr | 100° C. × 30 hr | 100° C. × 60 hr | 100° C. × 60 hr | 100° C. × 60 hr | 100° C. × 60 hr | 100° C. × 30 hr |

TABLE 1-continued

| | | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| pH | | 6.0 | 5.8 | 4.2 | 6.1 | 5.7 | 6.3 | 7.3 | 6.7 | — | 7.0 | 3.7 |
| Electrical conductivity | mS/cm | 55.6 | 56.7 | 57.5 | 55.8 | 55.8 | 53.2 | 52.4 | 102.1 | — | 29.9 | 51.3 |
| Viscosity | mPa·s | 102 | 69 | 58 | 8 | 9 | 8 | 8 | 13 | — | 10 | 9 |
| DLS average particle diameter | nm | 23.5 | 24.8 | 29.7 | 21.4 | 22.8 | 20.1 | 16.6 | 17.4 | — | 19.3 | 20.4 |
| Appearance | | Colloid-colored transparent solution | Colloid-colored transparent solution | Colloid-colored transparent solution | Colloid-colored transparent solution | Colloid-colored transparent solution | Colloid-colored transparent solution | Colloid-colored transparent solution | Colloid-colored transparent solution | Colloid-colored transparent solution | Colloid-colored transparent solution | Colloid-colored transparent solution |
| Ratio of DLS average particle diameter of after high temperature and salt/chemical fluid ratio | | 1.2 | 1.1 | 1.3 | 1.0 | 1.0 | 0.8 | 0.7 | 0.7 | — | 0.8 | 0.9 |
| Evaluation result of high temperature and salt resistance | | A | A | B | A | A | A | A | A | A | A | A |

| | | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Aqueous silica sol | | Synthesis Example 4 | Synthesis Example 4 | Synthesis Example 4 | Synthesis Example 4 | Synthesis Example 4 | Synthesis Example 4 | Synthesis Example 5 | Synthesis Example 6 | Synthesis Example 7 | Synthesis Example 4 | Synthesis Example 4 |
| Amount of silane treated Silane/SiO$_2$ | Ratio by mass | 0.8 | 0.8 | 0.8 | 0.8 | 0.8 | 0.8 | 3.4 | 0.8 | 0.8 | 0.8 | 0.8 |
| Silica concentration | % by mass | 3.0 | 10.0 | 18.0 | 18.0 | 18.0 | 18.0 | 3.0 | 18.0 | 18.0 | 18.0 | 18.0 |
| Anionic surfactant (AOS) concentration | % by mass | 2.3 | 2.3 | 0.9 | 0.3 | 0.3 | 0.3 | 2.3 | 0.3 | 0.3 | 0.9 | 0.3 |
| Anionic surfactant (SDS) concentration | % by mass | 2.2 | 2.2 | 0.9 | 0.3 | 0.3 | 0.3 | 2.20 | 0.3 | 0.3 | 0.9 | 0.3 |
| Nonionic surfactant concentration | % by mass | 10 | 10 | 3.6 | 1.2 | 1.2 | 1.2 | 10 | 1.2 | 1.2 | 3.6 | 1.2 |
| Anionic surfactant (AOS) kind | | AO-90 | AO-90 | LB-440 | LB-440 | LB-440 | LB-440 | AO-90 | LB-440 | LB-440 | LB-440 | LB-440 |
| AOS/SDS molar ratio | | 1.0 | 1.0 | 1.0 | 1.0 | 1.0 | 1.0 | 1.0 | 1.0 | 1.0 | 1.0 | 1.0 |
| Anionic surfactant/Silica mass ratio | | 1.54 | 0.48 | 0.09 | 0.03 | 0.03 | 0.03 | 1.54 | 0.03 | 0.03 | 0.09 | 0.03 |
| Nonionic surfactant kind | | EA-157 | EA-157 | EA-157 | EA-157 | EA-127 | EA-207D | EA-157 | EA-157 | EA-157 | EA-157 | EA-157 |
| Nonionic surfactant HLB | | 14.3 | 14.3 | 14.3 | 14.3 | 11.7 | 18.7 | 14.3 | 14.3 | 14.3 | 14.3 | 14.3 |
| Physical properties of chemical fluid | | | | | | | | | | | | |
| pH | | 9.1 | 8.4 | 3.7 | 3.4 | 3.5 | 3.4 | 9.1 | 3.5 | 3.0 | 3.7 | 3.4 |
| Electrical conductivity | mS/cm | 5.28 | 5.28 | 5.62 | 5.62 | 0.92 | 0.85 | 4.66 | 0.80 | 0.94 | 5.62 | 5.62 |
| Viscosity | mPa·s | 13 | 15 | 12 | 10 | 9 | 10 | 23 | 10 | 9 | 12 | 10 |
| DLS average particle diameter | nm | 23.1 | 21.1 | 20.7 | 20.9 | 21.1 | 21.2 | 12.2 | 78.0 | 120 | 20.7 | 20.9 |

TABLE 1-continued

| Physical properties of high temperature and salt resistance evaluation sample | | | | | | | | | | | | |
|---|---|---|---|---|---|---|---|---|---|---|---|---|
| Salt concentration | % by mass | 10 | Artificial seawater 1 | Artificial seawater 1 | Artificial seawater 1 | Artificial seawater 1 | Artificial seawater 1 | 4 | Artificial seawater 1 | Artificial seawater 1 | Artificial seawater 0.5 | Artificial seawater 0.5 |
| Silica concentration | % by mass | 1 | 1 | 1 | 1 | 1 | 1 | 1 | 1 | 1 | 1 | 1 |
| pH | | 7.9 | 7.7 | 7.0 | 7.3 | 7.0 | 7.1 | 8.4 | 7.6 | 7.1 | 7.1 | 7.1 |
| Electrical conductivity | mS/cm | 93 | 44.6 | 40.3 | 41.4 | 34.0 | 36.6 | 36.3 | 34.9 | 34.8 | 44.8 | 45.2 |
| Viscosity | mPa·s | 8 | 8 | 8 | 8 | 5 | 5 | 9 | 7 | 7 | 5 | 5 |
| DLS average particle diameter | nm | 18.1 | 20.7 | 21.9 | 22.0 | 23.1 | 22.9 | 13.7 | 76.0 | 120 | 22.5 | 22.5 |
| Evaluation of resistance to high temperature and salt | Evaluation procedure | Resistance to high temperature and salt evaluation-2 | Resistance to high temperature and salt evaluation-3 | Resistance to high temperature and salt evaluation-3 | Resistance to high temperature and salt evaluation-3 | Resistance to high temperature and salt evaluation-3 | Resistance to high temperature and salt evaluation-3 | Resistance to high temperature and salt evaluation-1 | Resistance to high temperature and salt evaluation-3 | Resistance to high temperature and salt evaluation-3 | Resistance to high temperature and salt evaluation-4 | Resistance to high temperature and salt evaluation-4 |
| Test condition | | 100° C. × 60 hr | 100° C. × 60 hr | 100° C. × 60 hr | 100° C. × 60 hr | 100° C. × 60 hr | 100° C. × 60 hr | 100° C. × 60 hr | 100° C. × 30 hr | 100° C. × 30 hr | 100° C. × 1800 hr | 100° C. × 1800 hr |
| pH | | 6.7 | 7.0 | 7.2 | 7.4 | 7.1 | 7.3 | 8.1 | 6.9 | 6.8 | 5.7 | 6.4 |
| Electrical conductivity | mS/cm | 92.1 | 41.0 | 39.1 | 39.8 | 32.6 | 36.4 | 36.1 | 34.7 | 35.2 | 32.0 | 33.0 |
| Viscosity | mPa·s | 8 | 8 | 8 | 9 | 5 | 5 | 9 | 7 | 7 | 5 | 5 |
| DLS average particle diameter | nm | 17.4 | 20.5 | 20.9 | 21.1 | 25.5 | 22.8 | 11.9 | 85.7 | 122 | 21.0 | 21.2 |
| Appearance | | Colloid-colored transparent solution | Colloid-colored transparent solution | Colloid-colored transparent solution | Colloid-colored transparent solution | Colloid-colored transparent solution | Colloid-colored transparent solution | Colloid-colored transparent solution | White-colored colloid solution | White-colored colloid solution | Colloid-colored transparent solution | Colloid-colored transparent solution |
| Ratio of DLS average particle diameter of after high temperature and salt/chemical fluid ratio | | 0.8 | 1.0 | 1.0 | 1.0 | 1.2 | 1.0 | 1.0 | 1.1 | 1.0 | 1.0 | 1.0 |
| Evaluation result of high temperature and salt resistance | | A | A | A | A | B | A | A | A | A | A | A |

TABLE 2

|  |  | Reference Example 1 | Reference Example 2 | Reference Example 3 | Reference Example 4 | Comparative Example 1 | Comparative Example 2 | Comparative Example 3 | Comparative Example 4 |
|---|---|---|---|---|---|---|---|---|---|
| Aqueous silica sol |  | ST-O | Synthesis Example 1 | Synthesis Example 2 | Synthesis Example 2 | Synthesis Example 3 | Synthesis Example 3 | Synthesis Example 4 | — |
| Amount of Silane treated Silane/$SiO_2$ | Ratio by mass | 0 | 0.09 | 0.2 | 0.2 | 0.4 | 0.4 | 0.4 | — |
| Silica concentration | % by mass | 3.0 | 3.0 | 3.0 | 3.0 | 3.0 | 3.0 | 3.0 | 0.0 |
| Anionic surfactant (AOS) concentration | % by mass | 1.5 | 1.5 | 1.5 | 1.5 | 4.4 | 0 | 0 | 2.3 |
| Anionic surfactant (SDS) concentration | % by mass | 3.0 | 3.0 | 3.0 | 3.0 | 0 | 4.4 | 0 | 2.2 |
| Nonionic surfactant concentration | % by mass | 20 | 20 | 0 | 10 | 10 | 10 | 0 | 10 |
| Anionic surfactant (AOS) kind |  | AO-90 | AO-90 | AO-90 | AO-90 | AO-90 | — | — | AO-90 |
| AOS/SDS molar ratio |  | 0.5 | 0.5 | 0.5 | 0.5 | — | — | 0 | 1.0 |
| Anionic surfactant/Silica mass ratio |  |  |  |  |  |  |  | — | — |
| Nonionic surfactant kind |  | NP-9 | NP-9 | — | EA-017 | EA-157 | EA-157 | — | EA-157 |
| Nonionic surfactant HLB |  | 13.0 | 13.0 | — | 2.7 | 14.3 | 14.3 | — | 14.3 |
| Remarks: test contents |  | Silane untreated | Too small amount of silane | Nonionic not added | Too low HLB | AOS alone | SDS alone | Silica alone | Silica untreated |
| Physical properties of chemical fluid |  |  |  |  |  |  |  |  |  |
| pH |  | 8.0 | 8.0 | 8.5 | 8.3 | 9.8 | 6 | 3.7 | 6 |
| Electrical conductivity | mS/cm | 4.00 | 3.74 | 4.51 | 5.33 | 5.33 | 5.69 | 0.09 | 5.69 |
| Viscosity | mPa·s | 580 | 442 | 6 | 20 | 15 | 15 | 8 | 15 |
| DLS average particle diameter | nm | 19.8 | 15.1 | 21.5 | Two-layer separation | 22.7 | 22.8 | 21.8 | 22.8 |
| Physical properties of high temperature and salt resistance evaluation sample |  |  |  |  |  |  |  |  |  |
| Salt concentration | % by mass | 4 | 4 | 4 |  | 10 | 10 | 10 | 10 |
| Silica concentration | % by mass | 1 | 1 | 1 |  | 1 | 1 | 1 | 0 |
| pH |  | 8.0 | 7.2 | 7.6 |  | 8.2 | 5.1 | 4.1 | 7.7 |
| Electrical conductivity | mS/cm | 45.0 | 47.3 | 57.9 |  | 52.4 | 53.2 | 85.0 | 89.5 |
| Viscosity | mPa·s | 136 | 128 | 8 |  | 10 | 12 | 5 | 10 |
| DLS average particle diameter | nm | 343 | 17.5 | 2768 |  | Not measurable | 18.9 | 24.2 | — |
| Evaluation of resistance to high temperature and salt | Evaluation procedure | Resistance to high temperature and salt evaluation-1 | Resistance to high temperature and salt evaluation-1 |  |  | Resistance to high temperature and salt evaluation-2 | Resistance to high temperature and salt evaluation-2 | Resistance to high temperature and salt evaluation-2 | Resistance to high temperature and salt evaluation-2 |
| Test condition |  | Room temperature for 7 days | Room temperature for 7 days |  |  | 100° C. × 60 hr | 100° C. × 60 hr | 100° C. × 60 hr | 100° C. × 60 hr |
| pH |  | 6.9 | 7.0 |  |  | 7.5 | 1.3 | 4.1 | 6.9 |
| Electrical conductivity | mS/cm | 48.9 | 47.2 |  |  | 52.3 | 57.8 | 58.1 | 94.8 |
| Viscosity | mPa·s | 458 | 128 |  |  | 9.5 | 10.5 | 5 | 10 |
| DLS average particle diameter | nm | Not measurable | 3704 |  |  | Not measurable | Not measurable | 25.0 | — |
| Appearance |  | White gel produced | Cloudy and two-phase separation |  |  | White gel produced | White gel produced | Colloid-colored transparent solution | transparent solution |
| Ratio of DLS average particle diameter of after high temperature and salt/chemical fluid ratio |  | — | 245 |  |  | — | — | 1.1 | — |
| Evaluation result of high temperature and salt resistance |  | E | E |  |  | E | E | A | — |

TABLE 3

(A) Evaluation of crude oil recovery - 1

|  | Reference Example 8 | Comparative Example 1 | Comparative Example 3 | Comparative Example 4 |
|---|---|---|---|---|
| Saltwater type | 3% by mass of Sodium chloride aqueous solution | | | |
| Crude oil substitute | n-decane | | | |
| Saturation amount of saltwater [ml] | 4.4 | 4.5 | 4.6 | 4.5 |
| Saturation amount of oil [ml] | 2.4 | 3 | 3.1 | 2.8 |
| Oil recovery ratio of saltwater flooding [%] | 12.4 | 11 | 12 | 10.1 |
| Oil recovery ratio of chemical flooding [%] | 53.9 | 0 | 22.6 | NG |

TABLE 3

(B) Evaluation of crude oil recovery - 2

|  | Example 13 | Example 14 | Example 15 | Example 16 | Comparative Example 3 |
|---|---|---|---|---|---|
| Saltwater type | Artificial Seawater | | | | |
| Crude oil substitute | Paraffin oil | | | | |
| Saturation amount of saltwater [ml] | 5 | 4.9 | 4.8 | 5 | 4.4 |
| Saturation amount of oil [ml] | 3.8 | 4.6 | 4.4 | 4.5 | 3.1 |
| Oil recovery ratio of saltwater flooding [%] | 16.8 | 24.2 | 17.6 | 27.6 | 17.8 |
| Oil recovery ratio of chemical flooding [%] | 13 | 22 | 32.9 | 24.1 | 8.1 |

TABLE 4

Surface tension

|  | Surface tension [mN/m] |
|---|---|
| Example 5 | 32.6 |
| Example 6 | 32.5 |
| Example 7 | 32.8 |
| Example 11 | 31.3 |
| Example 13 | 32.5 |
| Example 14 | 31.8 |
| Comparative Example 3 | 64.9 |
| Pure water | 72.1 |
| Artificial seawater | 67.6 |
| Saltwater with salt concentration of 4% by mass | 44.0 |

As shown in Table 1, in the chemical fluids of Example 1 to Example 12 and Example 17 having a pH of 7 or more to less than 12, and the chemical fluids of Example 13 to Example 16 and Example 18 to Example 21 having a pH of 2 or more to less than 7, phase-separation or gelation was not observed even after heating at 100° C. for a long time in a salt water.

In addition, as to DLS average particle diameter of aqueous silica sol (silica particles) in the samples, the ratio of the DLS average particle diameter after high temperature and salt resistance test to the DLS average particle diameter of the chemical fluid was 1.3 or less, particularly the ratio in the chemical fluids of Example 2, Example 4 to Example 14 and Example 16 to Example 21 was 1.1 or less, and thus it was confirmed that the silica sol is not degraded and is stable, and the chemical fluids are excellent in a resistance to high temperature and salt.

In Example 20 and Example 21, the ratio of the DLS average particle diameter after high temperature and salt resistance test at 100° C. for 1800 hours (75 days) to the DLS average particle diameter of the chemical fluid was 1.0, and thus it was confirmed that silica sol is not degraded and is stable, and the chemical fluids are very excellent in a resistance to high temperature and salt.

On the other hand, as shown in Table 2, in the chemical fluid of Reference Example 1 in which an aqueous silica sol including no silane compound was used, the DLS average particle diameter becomes large at the stage where a sample for a high temperature and salt resistance evaluation was prepared prior to carrying out a high temperature and salt resistance evaluation test, and a white gel was formed after 7 days at room temperature (normal temperature), and thus a resistance to salt was very poor.

In addition, in the chemical fluid of Reference Example 2 in which an aqueous silica sol including a silane compound in a mass ratio less than 0.1 based on silica was used, white turbidity (cloudy substance) was formed after (High Temperature and Salt Resistance Evaluation-1), and immediately solid-liquid (two-phase) separation occurs, a large amount of white gel was formed after 7 days at room temperature (normal temperature), and thus a resistance to salt was very poor.

Further, the chemical fluid of Reference Example 3 including no nonionic surfactant became cloudy immediately after preparing a sample for high temperature and salt evaluation to separate out cloudy gel (DLS average particle diameter by observation: 2768 nm), the high temperature and salt resistance evaluation could not be carried out, and thus a resistance to salt was very poor even at room temperature (normal temperature).

In addition, in the chemical fluid of Reference Example 4 in which a nonionic surfactant having an HLB less than 3 was used, as the hydrophobicity of the nonionic surfactant is strong, water-oil two-phase separation occurs at the stage of preparing the chemical fluid, and a sample for high temperature and salt evaluation could not be prepared, and thus the high temperature and salt evaluation could not be made.

In both chemical fluids of Comparative Example 1 and Comparative Example 2 including only one anionic surfactant, white turbidity (cloudy substance) was formed after "High Temperature and Salt Resistance Evaluation-1", and thus a resistance to high temperature and salt was poor. It is assumed that the inclusion of two or more anionic surfactants in the chemical fluids of Examples 1 to 21 according to the present invention causes an improvement of packing effect to realize stabilization.

In addition, as shown in Table 3, regarding oil recovery ratio of chemical fluid (oil recovery ratio of chemical fluid flooding), the chemical fluids of Example 8, Example 13, Example 14, Example 15 and Example 16 exhibited high oil recovery ratio for n-decane and paraffin oil being crude oil substitutes.

On the other hand, the chemical fluid of Comparative Example 3 including only an aqueous silica sol the surface of which was treated with a silane compound (including no surfactant) exhibited a good resistance to high temperature and salt as shown in Table 2, but as shown in Table 3, the oil recovery ratio thereof was rather low compared with Example 8 (n-decane), or Example 13, Example 14, Example 15 and Example 16 (paraffin oil).

In addition, the chemical fluid of Comparative Example 4 including no aqueous silica sol and only surfactant exhibited a good resistance to high temperature and salt as shown in Table 2, but as shown in Table 3, the recovered liquid in (Crude Oil Recoverability Evaluation-1) was intensely emulsified, and it was difficult to separate oil and water, and thus it was not substantially able to recover oil.

Further, in the chemical fluid of Reference Example 1 including an aqueous silica sol the surface of which was not treated with a silane compound, a pressure of a hydraulic pump rises immediately after starting the chemical fluid flooding in in (Crude Oil Recoverability Evaluation-1), and the chemical fluid could not be further pressed thereinto. This is assumed because the chemical fluid is aggregated and blocked in Berea sandstones.

It was confirmed from the above-mentioned results that the crude oil recovery chemical fluid of the present invention is excellent in resistance to high temperature and salt, and excellent also in oil recovery ratio, and thus it is a high-performance crude oil recovery chemical fluid.

In addition, as shown in Table 4, the chemical fluids of Example 5 to Example 7, Example 11, Example 13 and Example 14 exhibited a lower surface tension due to the effect of addition of surfactants compared with pure water, artificial seawater and saltwater of a salt concentration of 4% by mass (saltwater of sodium chloride concentration of 3.2% by mass, calcium chloride concentration of 0.8% by mass), and further the chemical fluid of Comparative Example 3. Therefore, interfacial tension of water-oil in oil reservoirs is lowered, replacement effect of oil with water is enhanced, and thus the enhanced crude oil recovery effect can be expected.

The invention claimed is:

1. A crude oil recovery chemical solution which exhibits excellent resistance to high temperature and salt, comprising a silane compound, an aqueous silica sol comprising colloidal silica particles dispersed in an aqueous solvent having an average particle size of from about 3 nm to about 200 nm, two or more anionic surfactants, and one or more nonionic surfactants;
    wherein the aqueous silica sol contains silica particles in which at least a part of the silane compound is bonded on the surface of at least a part of the silica particles in the sol; wherein the aqueous silica sol has a silica concentration of about 5% to about 55% by mass; and wherein the aqueous silica sol is present in an amount of from about 3% by mass to about 30% by mass, based on the total mass of the crude oil recovery chemical solution, in terms of silica solid content;
    wherein the silane compound is present in a ratio of from about 0.1 to about 10.0 of silane compound based on the mass of silica solid content of the aqueous silica sol;
    wherein the two or more anionic surfactants are independently selected from the group consisting of a sodium salt or a potassium salt of a fatty acid, an alkylbenzene sulfonate, a higher alcohol sulfate ester salt, a polyoxyethylene alkyl ether sulfate, an α-sulfo fatty acid ester, an α-olefin sulfonate, a monoalkyl phosphate ester salt, and an alkane sulfone acid salt; wherein the anionic surfactants are present in an amount of from about 0.001% by mass to about 20% by mass, based on the total mass of the crude oil recovery chemical fluid;
    wherein the nonionic surfactants have an HLB of from about 11.0 to about 20.0, and wherein the nonionic surfactants are selected from the group consisting of polyoxyethylene alkyl ether, polyoxyethylene alkylphenol ether, alkyl glucoside, polyoxyethylene fatty acid ester, sucrose fatty acid ester, sorbitan fatty acid ester, polyoxyethylene sorbitan fatty acid ester and fatty acid alkanolamide, wherein the nonionic surfactants are present in an amount of from about 0.001% by mass to about 30% by mass, based on the total mass of the crude oil recovery chemical fluid; and
    wherein the ratio of DLS average particle diameter of the chemical solution before and after the chemical solution is exposed to high temperature and salt is less than 1.5.

2. The crude oil recovery chemical solution of claim 1, wherein the silane compound comprises a silane coupling agent having at least one organic functional group, wherein the organic functional group is selected from the group consisting of vinyl group, ether group, epoxy group, styryl group, methacryl group, acryl group, amino group, isocyanurate group, alkoxysilane, silazane and siloxane.

3. The crude oil recovery chemical solution of claim 1, wherein the aqueous silica sol is present in an amount of from about 10% by mass to about 25% by mass, based on the total mass of the crude oil recovery chemical solution, in terms of silica solid content.

4. The crude oil recovery chemical solution of claim 1, wherein the anionic surfactants are a combination of a higher alcohol sulfate ester salt and an α-olefin sulfonate.

5. The crude oil recovery chemical solution according to claim 1, wherein at least a part of the silane compound is not bonded on the surface of the silica particles in the sol.

6. The crude oil recovery chemical solution according to claim 1, produced by a process comprising combining the silane compound, the aqueous silica sol, two or more anionic surfactants, and one or more nonionic surfactants.

7. The crude oil recovery chemical solution according to claim 6, wherein the aqueous silica sol comprises silica particles obtained by (a) adding the silane compound to the aqueous silica sol in a ratio of from about 0.1 to about 3.0, based on the mass of the silane compound in terms of the silica particles (silica solid content) in the aqueous silica sol, and (b) heating from about 50° C. to about 100° C. for from about 1 hour to about 20 hours.

8. The crude oil recovery chemical solution according to claim 1, wherein the silane compound is present in a ratio of from about 0.1 to about 3.0 of silane compound based on the mass of silica solid content of the aqueous silica sol.

* * * * *